US012571446B2

(12) United States Patent
Burr

(10) Patent No.: US 12,571,446 B2
(45) Date of Patent: Mar. 10, 2026

(54) DEVICE FOR ATTENUATING ENERGY

(71) Applicant: Accelerated Research LLC, Midland, MI (US)

(72) Inventor: Scott Burr, Midland, MI (US)

(73) Assignee: Accelerated Research LLC, Midland, MI (US)

( * ) Notice: Subject to any disclaimer, the term of this patent is extended or adjusted under 35 U.S.C. 154(b) by 0 days.

(21) Appl. No.: 18/634,152

(22) Filed: Apr. 12, 2024

(65) Prior Publication Data

US 2024/0255040 A1     Aug. 1, 2024

Related U.S. Application Data

(63) Continuation of application No. 17/397,424, filed on Aug. 9, 2021, now Pat. No. 11,965,573.

(60) Provisional application No. 63/063,451, filed on Aug. 10, 2020.

(51) Int. Cl.
| | |
|---|---|
| *F16F 1/371* | (2006.01) |
| *A42B 3/12* | (2006.01) |
| *F16F 1/373* | (2006.01) |
| *F16F 7/00* | (2006.01) |

(52) U.S. Cl.
CPC ............... *F16F 1/371* (2013.01); *A42B 3/12* (2013.01); *F16F 1/373* (2013.01); *F16F 7/00* (2013.01); *F16F 2230/0029* (2013.01); *F16F 2232/06* (2013.01); *F16F 2234/02* (2013.01)

(58) Field of Classification Search
None
See application file for complete search history.

(56) References Cited

U.S. PATENT DOCUMENTS

| | | | |
|---|---|---|---|
| 1,791,237 | A | 2/1931 | Edelson et al. |
| 1,837,847 | A | 12/1931 | Bowersox |
| 2,313,171 | A | 3/1943 | Piliero |
| 4,673,170 | A | 6/1987 | Dykema |
| 4,843,737 | A | 7/1989 | Vorderer |
| 7,954,259 | B2 | 6/2011 | Antonelli et al. |
| 8,528,119 | B2 | 9/2013 | Ferrara |
| 8,539,696 | B2 | 9/2013 | Greene |

(Continued)

FOREIGN PATENT DOCUMENTS

| | | |
|---|---|---|
| CA | 2633067 A1 | 3/2009 |
| DE | 10047936 A1 | 7/2001 |

(Continued)

OTHER PUBLICATIONS

WO-2005084495-A1: English Machine Translation (Year: 2005).*
DE-10004015-A1: English Machine Translation (Year: 2001).*
FR-2884883-A1: English Machine Translation (Year: 2006).*

*Primary Examiner* — Melanie Torres Williams
(74) *Attorney, Agent, or Firm* — Young Basile Hanlon & MacFarlane, P.C.

(57) ABSTRACT

These teachings relate to a device that includes a base having an axis that is centered and perpendicular relative to the base and two or more arms each connected to the base at a base hinge The base hinge rotates the two or more arms away from the axis, and one or more expandable bands are connected with distal ends of the two or more arms. The one or more expandable bands absorb energy from rotating of the two or more arms. The device absorbs energy when an external force is applied along the axis of the base.

20 Claims, 11 Drawing Sheets

(56)                    References Cited

U.S. PATENT DOCUMENTS

| | | | |
|---|---|---|---|
| 8,650,774 | B2 | 2/2014 | Aveni et al. |
| 8,720,084 | B2 | 5/2014 | Smaldone et al. |
| 8,863,320 | B2 | 10/2014 | Kelly et al. |
| 8,893,404 | B2 | 11/2014 | Aveni et al. |
| 9,316,282 | B1 | 4/2016 | Harris |
| 9,320,311 | B2 | 4/2016 | Szalkowski et al. |
| 10,595,577 | B1 | 3/2020 | Lewis |
| 2008/0016720 | A1 | 1/2008 | Aveni et al. |
| 2010/0301531 | A1 | 12/2010 | Delahousse et al. |
| 2019/0090582 | A1 | 3/2019 | Yoshida et al. |
| 2019/0184613 | A1 | 6/2019 | Yoshida et al. |

FOREIGN PATENT DOCUMENTS

| | | | | |
|---|---|---|---|---|
| DE | 10004015 | A1 * | 8/2001 | ........... A47C 23/002 |
| EP | 132048 | A1 | 1/1985 | |
| FR | 2884883 | A1 * | 10/2006 | ........... A47C 23/002 |
| FR | 2976993 | A1 | 12/2012 | |
| WO | WO-2005084495 | A1 * | 9/2005 | ......... A47C 27/0456 |

* cited by examiner

DEVICE FOR ATTENUATING ENERGY

CROSS-REFERENCE TO RELATED APPLICATIONS

This application is a continuation of U.S. application Ser. No. 17/397,424, filed on Aug. 9, 2021, which claims priority to U.S. Provisional Patent Application No. 63/063,451, filed Aug. 10, 2020, the entire disclosures of which are hereby incorporated by reference.

FIELD

This teaching relates to a device for attenuating energy and assemblies containing a plurality of the devices.

BACKGROUND

In any activity where two surfaces will impact with a high force, an attenuation device can be useful to mitigate or control the forces resulting from the impact. Attenuation devices have been used in a wide range of larger apparatuses including automobiles, helmets, shoes, protection barriers, and/or paddings. In each activity, the attenuation devices included in the larger apparatuses may have different purposes. For example, attenuation devices in helmets protect the user's head from injury. In another example, attenuation devices in shoes protect a user's feet and provide a repulsion force that propels the user after the shoe contacts the ground.

Often, the attenuation devices are small and can be arranged in a in group so that multiple attenuation devices work together to absorb forces being applied to the object. In some instances, multiple attenuation devices absorb energy from an impact so that a user can be protected from the external forces in multiple areas. For example, in a helmet, the attenuation devices may be arranged below a round and hardened surface so that forces are attenuate-able from multiple angles or directions, with the purpose of eliminating concussions. In some examples, the attenuation devices can be arranged between two flat surfaces or walls so that, when the attenuation device is impacted, the external force is applied to multiple attenuation devices.

The mechanism for mitigating the forces exhibited by the impact is generally a device that is partially collapsible or compressible. In some instances, attenuation devices use internal springs, foams, or bladders to mitigate impacts from external forces. For example, see U.S. Pat. Nos. 4,843,737A, 8,528,119B2, 8,539,696B2, and 8,863,320B2. However, these attenuation devices lack adequate compression lengths, reusability, sufficient ventilation, or control over the amount of energy absorbed.

What is needed is a device that efficiently uses packaging space to absorb energy from high impacts. What is needed is a device that has an efficiency which can be tailored to the user's needs. What is needed is a device that absorbs energy and keeps the user comfortable in extraneous activities and hot climates. What is needed is a device that is usable in an apparatus, like a helmet, and absorbs energy without replacing other components of the apparatus, such as the external shell. What is needed is a device in which the energy absorbing response can be tuned and optimized.

SUMMARY

These teachings relate to a device that includes a base having an axis that is centered and perpendicular relative to the base and two or more arms each connected to the base at a base hinge. The base hinge rotates the two or more arms away from the axis, and one or more expandable bands are connected with distal ends of the two or more arms. The one or more expandable bands absorb energy from rotating of the two or more arms. The device absorbs energy when an external force is applied along the axis of the base. The base, the two or more arms, or both may include a material which is rigid and capable of forming a living hinge. The base and the distal portion of the two or more arms may be spaced by a compression length that extends along the axis, and when force is applied to the base, the compression length is reduced by a percentage length of about 90 percent or more. The device may further comprise a pad connected with the base, the distal portion of the two or more arms, or the ring that contacts a user or a substrate. The base, the two or more arms, or both may comprise one or more first materials which are capable of forming a living hinge, and the base, the two or more arms, or both may be coupled with one or more second materials capable of strengthening or stiffening the base, the two or more arms, or both.

These teachings relate to a device including a base having an axis that is centered and perpendicular relative to the base and two or more arms each connected to the base at a base hinge. The device includes one or more arm hinges embedded in each of the two or more arms and allow the two or more arms to rotate in an outward direction relative to the axis, and the device includes a ring having a position that is parallel and fixed relative to the base and the axis. The ring is connected with distal ends of the two or more arms and allows rotational motion of the two or more arms without moving the position of the ring. The device includes one or more expandable bands connected with the one or more arm hinges and absorb energy from folding of the two or more arms. The device absorbs energy when the base and the ring are pushed together along the axis by an external force. The base, the two or more arms, or both may include a material which is rigid and capable of forming a living hinge. The base and the distal portion of the two or more arms may be spaced by a compression length that extends along the axis, and when force is applied to the base, the compression length is reduced by a percentage length of about 90 percent or more. The device may further include a stop contacting an interior portion of the arm hinge so that, when the two or more arms rotate, the stop prevents rotating at an angle of 90° or less at the arm hinge. The device may further comprise a pad connected with the base, the distal portion of the two or more arms, or the ring that contacts a user or a substrate. The base, the two or more arms, or both may comprise one or more first materials which are capable of forming a living hinge, and the base, the two or more arms, or both may be coupled with one or more second materials capable of strengthening or stiffening the base, the two or more arms, or both.

These teachings relate to an apparatus that includes a plurality of devices that are connected to a substrate, and the plurality of the devices are arranged on the substrate so that the plurality of devices are capable of absorbing energy when an external force is applied on the substrate. The apparatus may further include a pad connected with an exterior surface of the base and that may contact a user. The apparatus may include a substrate of an exterior layer of a helmet having an internal surface and an external surface, and the substrate may protect a user from an external force applied on the external surface, and the plurality of devices may be arranged on the helmet at the internal surface and contact a user's head.

The present teachings provide devices and apparatuses for absorbing energy by compressing up to about 90 percent or more so that packaging space is optimized. The present teachings provide devices and apparatuses that are highly tunable so that the user can control the absorption of energy so that device is tunable to resist force as a function of the compression length. The present teachings provide devices with an energy absorbing structure that is hollow so that, when used in an apparatus, device has strong air flow and a light weight. The present teachings provide devices that controllably absorb and attenuate energy from an impact. The attenuation of energy by the devices may allow the larger substrate to be reused.

The present teachings provide in another aspect a device including first and second supports that are separated from each other, and a cylinder connected with the first or second support and configured to depress and absorb energy when a force is applied to the device, two or more arms connected with and outwardly rotatable at the first and second supports so that as the arms rotate the first and second supports move into each other along the axis and depress the cylinder.

The cylinder may include one or more walls that extend substantially perpendicular relative to the support. The one or more walls of the cylinder may define an aperture. The two or more arms may each include a hinge configured to facilitate bending of the two more arms as the two or more arms rotate at the first and second supports. The apparatus may include one or more expandable bands connected with an exterior surface of the two or more arms and configured to absorb energy as the two or more arms bend. The two or more arms may each include a first portion connected with the one or more hinges and the first support; and a second portion connected with the one or more hinges and the second support. The first and second portions of each of the two or more arms may fold onto each other as the two or more arms bend. The cylinder may have a height that is the same or less than a height of the first or second portion.

In another aspect, the present disclosure provides a device that includes a first support comprising a cylinder that is configured to inwardly depress towards the first support when a force is applied; a second support spaced a distance from the first support along an axis centered relative to the first and second supports; and two or more arms each connected with and outwardly rotatable and foldable relative to the first and second supports so that the cylinder depresses as the first and second supports move into contact with each other.

The one of the first or second supports may connect with an apparatus an external surface that faces away from the cylinder. The device may further include one or more expandable bands connected with an exterior surface of the arms and configured to absorb energy as the first and second supports move together along the axis. The cylinder may include walls that define an aperture. The two or more arms may each include a first end connected to the first support; a second end connected to the second support; and one or more hinges that connect the first and second end. The first portion of each of the two or more arms may include stop configured to bend a second portion of each of the two or more arms as the two or more arms fold into each other. The first and second portions of each of the two or more arms may fold into each other at the stop before contacting the cylinder. The first support may be a base comprising an aperture at a location of the cylinder, and wherein the second support is a ring.

In another aspect, the present disclosure provides a device that includes a base; a ring aligned with the base along an axis; two or more arms that connect the base and the ring and are configured to outwardly rotate relative to the base and the ring and bend as the base and the ring depress into each other along the axis; and one or more expandable bands connected with exterior surfaces of the two or more arms and configured to absorb energy during rotating and bending of the two or more arms at a foldable portion.

The foldable portion may include a hinge configured to allow the two or more arms to fold onto each other. Each of the two or more arms may include a stop that facilitates bending each of the two or more arms. The base may connect with an apparatus at an external surface of the base. The base may further include a cylinder positioned on the base and configured to depress as the ring and/or two or more arms move into contact with the cylinder.

DETAILED DESCRIPTION OF THE DRAWING

Figure 1:
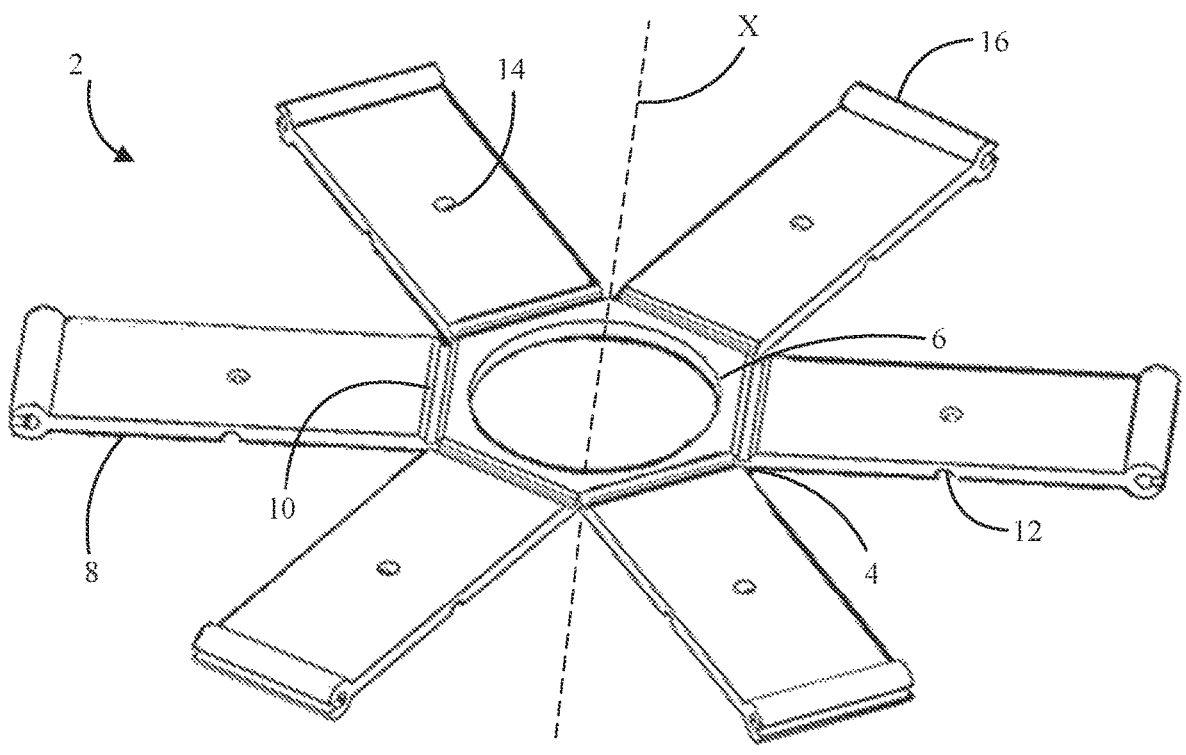
FIG. 1 is a perspective view of a device without one or more expandable bands.

The explanations and illustrations presented herein are intended to acquaint others skilled in the art with the invention, its principles, and its practical application. The specific embodiments of the present invention as set forth are not intended to be exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. Unless defined otherwise, all technical and scientific terms used herein have the meaning commonly understood by a person skilled in the art.

The components in this disclosure may be described as "at rest." The term "at rest" means that the device or the components of the device are not absorbing energy from an external force that is being applied on any component or at any angle on the devices. In the context of the expandable bands, expanding or expansion means that the expandable bands have a diameter during expansion and at rest, and the diameter is larger during expansion when compared to a diameter at rest. The term "rigid" refers to a material that is stiff, firm, or both so that the structure of the component that is "rigid" is resistant to folding or permanent deformation. Compression of the device refers to the folding or rotating of one or more arms so that the length of the device between the base and the distal end of the arms is reduced. Regarding position of contact or application, external forces contact may be applied to any position on an external surface of the device including the arms, the base, the expandable bands, the ring, or any combination thereof so long as the external forces are applied to the exterior of any of the components. In the context of one or more second materials, "coupled with" means that the one or more second materials may be combined with, filled with, formed on, adhered to, over molded on, or mixed with, or any combination thereof, the one or more first materials so that the arms, the base, or both are strengthened or stiffened. A "component" of the device may be any part described herein include the base, the arms, the base hinge, the arm hinge, the connector, the ring, the expandable bands, or any subcomponent thereof.

The device functions to absorb energy when an external force is applied to the device. The device may be able to repeatedly absorb energy from external forces. The device may be configured to absorb a high amount of energy and break after few or a single use so that a user replaces the device after breakage. The device may include at least a base, two or more arms, and one or more expandable bands, and the one or more expandable bands may absorb a significant portion of energy from the folding of the two or more arms when an external force is applied to the device. At rest, the device may have a length that is measure from the base to the distal end of an arm, when the device is assembled with an expandable band, a ring, or both. The length can be any length that is appropriate for the specific application. The length may be about 5 mm or more, about 10 mm or more, or about 20 mm or more. The length may be about 1000 mm or less, about 500 mm or less, about 100 mm or less, about 50 mm or less, or about 25 mm or less. The base and a distal portion of each of the arms may be spaced by a length that extends along the axis. When force is applied to the base, the length may be reduced by a percentage length. The percentage length may be about 55 percent or more, 65 percent or more, or 75 percent or more. The percentage length may be about 80 percent or more, about 85 percent or more, or about 90 percent or more. The percentage length may be about 93 percent or more, about 95 percent or more, about 97 percent or more, or about 99 percent or more. The device may have a percentage length that is 100 percent or less, controlled to any compression percentage described herein.

When assembled with the ring, the expandable bands, the arms, and the base, the assembled components of the outer portion of the device may have a hollow interior. In this way, the device may be unobstructed from compressing up a full compression length or less (i.e., 100 percent or less compression of the length), as described herein. The expandable bands, the arm hinges, the base hinge, or any combination thereof may provide tension on an external surface of the device so that energy is absorbed on the external surface of the device. In some examples, the tension from the expandable bands, the arm hinges, the base hinge, or any combination thereof may place tension on an external surface of the device and may exert pressure on the one or more of the arms towards the axis. Even with pressure being exerted on the one or more arms towards the axis, the arms may still be configured to rotate or fold outwardly from the axis.

Because the materials that compose each of the components may vary in properties and/or the geometric construction, the device is highly tunable. For example, the device may include an expandable band, a base, arms, base hinges, arm hinges, a ring, or any combination thereof that allow the compression percentage to vary based on each the properties of the components including rigidity, elasticity, width, thickness, length, diameter, stiffness yield stress, failure strain, or any combination thereof. The compression percentages described herein may be changed based on the materials used in each of the components of the device and/or based on the geometric construction in each of the components of the device. Thus, the tunability may be controlled in varying configurations of the device.

The device may be made from any technique known to a skilled artisan to form rigid structures that can be assembled into a hinged assembly. For example, the device or the components that are included in the device may be formed by rotational molding, injection molding, blow molding, compression molding, extrusion molding, thermoforming, stamping, laser cutting, machining, liquid molding, additive manufacturing (commonly referred to as 3D printing) a combination thereof, or any technique sufficient to make rigid components that are connected or connectable to form a hinged assembly. For example, the base may be formed separately from the arms, and the arms may be connected to the base by one or more hinge techniques known to a skilled artisan. In other examples, the base and the arms may be molded or formed simultaneously so that the base and the arms are connected at a living hinge such that the arms can rotate independent of the base. The connection between the base and the arms may be made by any structure or device that connects the base and the arms and which allows the arms to rotate with respect to the base.

The base functions to provide a foundation for folding or rotating the arms when pressure is applied to the device. The base may be referred to as a first or second support. The base may contact all of the arms at base hinge locations. The base may have a contiguous surface or include one or more apertures, as described herein. The base may have a thickness that is different than the arms, the base hinge, the arm hinge, or any combination thereof. The base may have a thickness that is the same as the arms. The base may have a thickness which provides sufficient rigidity to the system and the thickness required for this function will vary depending upon the materials utilized for the base. The base may have a thickness of about 0.1 mm or more, about 0.5 mm or more, or about 1 mm or more. The base may have a thickness of about 7.5 mm or less, about 5 mm or less, or about 2.5 mm or less. The base may have a diameter which provides sufficient size to the device for energy attenuation in the desired application. The base may have a diameter that is measured from a straight line passing from side to side through the center of the base. The diameter of the base may be about 5 mm or more, about 20 mm or more, or about 40 mm or more. The diameter may be about 150 mm or less, about 100 mm or less, or about 50 mm or less. The base may have the same diameter as a diameter of the expandable bands at rest, the ring, or both.

The base may contain one or more apertures. The one or more apertures function to provide a foundation for attaching a substrate that assists the device to absorb energy when a force is applied to the device and decreasing the amount of material used in the volume of the base. The one or more apertures may function to increase the compression length so that the device is compressible a longer length along the axis when a pad is used because the pad is compressible through the aperture. In some examples, the thickness of the base affects the compression length relative to the one or more apertures and/or pad. In some examples, where the base has a large diameter (e.g., when the diameter of the base is the same as the length of the one or more arms), the one or more apertures may allow the device to have a maximized or increased compression length along the axis. The one or more apertures may be centered or off-centered on the base. One of the apertures may be a reference point for determining the axis. The aperture may have a center point, and the axis may extend through the center point. The one or more apertures may be configured to connect with a pad or substrate that is compressible through the aperture. The one or more apertures may be any shape that achieves the desired function; and may be circular, round, oval, triangular, square, rectangular, pentangular, hexangular, heptangular, octangular, nonangular, polyangular, or irregular.

The pad may function to provide a soft or comfortable surface to contact a user or a substrate, and to resist movement or absorb some energy from an external force so that the pad may help the device absorb energy. The pad may be connected with the base, the distal portion one or more of the arms, or the ring and may be configured to contact a user or a substrate. The pad may be configured to contact a substrate. The substrate may be any structure suitable connect with the pad and make contact with an external force. The pad may be connected to the substrate, the ring, base, or any combination thereof by a material or structure capable of connecting the pad to the substrate, the ring, the base, or any combination thereof. The pad may be connected to the substrate, ring, base, or any combination thereof by one or more of an adhesive, two-sided tape, hook and loop fasteners, mechanical locking feature, ultrasonic welding, snap fit, or commonly known mechanical fastener, or any combination thereof. The pad may include a material which is configured to absorb at least some of the energy when an external force is applied to the base. The pad may comprise one or more of expanded polystyrene, expanded polypropylene, ethylene-vinyl acetate, polyurethane foam, polychloroprene rubber, expanded polylactic acid, closed cell comfort foam, open cell comfort foam, memory foam, air bladder, fluid filled bladders, gel filled bladders (fluid could be a gel or air), or any combination thereof. The pad may be significantly larger than a single of device, and a plurality of the devices may be arranged on a single pad.

The arms function to at least partially absorb energy by folding or rotating when a force is applied to the device. The arms may have rotational motion relative to the arm hinge, the base hinge, the ring, the expandable bands, the connectors, or any combination thereof. On the arms, the device may include a stop on some or all of the arms that is used to obstruct the full range of motion of the arms. The device may include as many arms that would be sufficient for interfacing with the expandable bands to absorb energy from an external force applied to the device. The device may include one or more arms, two or more arms, three or more arms, four or more arms, five or more arms, six or more arms, seven or more arms, eight or more arms, nine or more arms, ten or more arms, eleven or more arms, twelve or more arms, or a plurality of arm. The device may include an even or odd number of arms. Where an odd number of arms are included in the device, an external force applied to the device may fold or rotate one or more of the arms before rotating another one of the arms. Where an even number of arms are included in the device, an external force applied to the device may uniformly fold or rotate all of the arms simultaneously. The arms may be configured to absorb some amount of energy from rotation of the arms at the base hinge, the arm hinge, distal portion of each arm, or any combination thereof. The arms may be permanently fixed or releasably connectable with the rings, the expandable bands, or both. The arms may be permanently fixed or releasably connectable with the ring, the expandable bands, or both at one or more connectors. In some examples, at least one of the arms may be integrally molded with at least one portion of the ring, the base, or both so that the device can be a single contiguous part. The arms may be divided into multiple portions that are separated by one or more arm hinges. For example, the arms may have an upper portion and a lower portion that is separated by a single arm hinge. The arms may have a thickness that is different than the base, the base hinge, the arm hinge, or any combination thereof. The arms may have a thickness sufficient to transfer the compression forces to the expandable bands without buckling or deforming in an unstable manner. The arms may a thickness of about 0.1 mm or more, about 0.5 mm or more, or about 1 mm or more. The arms may have a thickness of about 7.5 mm or less, about 5 mm or less, or about 2.5 mm or less. The arms may have a length that is measured from the point of contact with the base or the base hinge to the distal end of the arm. The length of the arm may be chosen to allow the arms to deform in a manner that provides the desired resistance force and stable rotational pattern of the arms, deformation pattern of the device, or both. The length of the arm may be about 3 mm or more, about 5 mm or more, or about 10 mm or more. The length of the arm may be about 150 mm or less, about 100 mm or less, about 50 mm or less, or about 30 mm or less. The arms may have a rigid structure or be composed of a rigid material that is temporarily deformable so that some or all of the energy is absorbed when an external force is applied to the device and when the arms partially bend or deform.

The base, the arms, or both may comprise a material which is rigid. The base, the arms, or both may comprise a material which is capable of forming living hinges. The base, the arms, or both may comprise a material which is rigid when no force is applied and which may bend when the expandable bands have fully expanded and a portion of the arms are not parallel to the base. The base, the arms, or both may include one or more first materials which are capable of forming a living hinge. The base, the arms, or both may be filled with one or more second materials capable of impacting the strength, stiffness, or modulus of the base and/or arms. The one or more first materials may be different than or similar to the one or more second materials. The one or more first materials or the one or more second materials may be blended with, mixed with, coupled with, filled with, coated with, or surrounded by either of the one or more first materials or one or more second materials so that the strength and stiffness of the arms, the base, or both is improved. The base, the arms, or both may comprise one or more of a polyolefin, a modified polyolefin, a polycarbonate/acrylonitrile butadiene styrene, an acrylonitrile based styrene based material, a polyamide, a polypropylene, polyethylene, polyester elastomer thermoplastic, thermoplastic polyolefin, co-polyester, thermoplastic polyurethane, any combination thereof, or any other polymer capable of providing the desired material properties. The base, the arms, or both may be filled with one or more of a metal, metal structure, synthetic fiber, continuous fibers, random fibers, short and long fibers, woven or unwoven fiber structures, rigid plastic insert, or any combination thereof. The base the arms, or both may be either primarily the first material or the second material. The base may comprise one or more of the same materials as the arms. The base and the arms may be comprised of substantially the same materials so that the device can be assembled as a continuous mold. The base and the arms may each be comprised of one or more differing materials. The base may be composed as the same or different material(s) as the arm hinge, the base hinge, the ring, or any combination thereof. The arm may be composed of the same or different material(s) as the arm hinge, the base hinge, the ring, or any combination thereof. The base, the arms, the arm hinge, the base hinge, the ring, or any combination thereof may be composed of the same materials so that, when the device is assembled, the device is capable of having a single contiguous structure that is composed of the same material. Using techniques known to a skilled artisan, the base, the arms, the arm hinge, the base hinge, the ring, or any combination thereof may be composed of a first material materials so that, when the device is assembled, the device is capable of having a single contiguous structure that is composed of the first material in each component, and the device may be filled with one or more second materials at the base, the arms, the arm hinge, the base hinge, the ring, or any combination thereof so that, when the device is assembled, the device is capable of having a single contiguous mold composed of the first material and filled with the second material.

The base hinge may function to allow rotatable or foldable motion between the arm and the base. The base hinge may contact the arms, the base, or both. When an external force is applied to the device, the base hinge may assist with absorbing some of the energy as the arms rotate or fold relative to the base. The base hinge may comprise a material which is capable of forming living hinges. The base hinge may comprise a material which is rigid when no force is applied and which may bend when the expandable bands have fully expanded and a portion of the arms are not parallel to the base. The base hinge may have a thickness that is sufficient to act as a functional living hinge while concurrently being structurally robust enough to transmit the applied forces to the adjacent members of the structure. The base hinge may have any thickness that is sufficient to allow full rotational motion of the base and the arms. The base hinge may have a thickness that is different than the arms, the base, the arm hinge, or any combination thereof. The base hinge may have a thickness that is the same as the arms hinge. The base hinge may have a thickness of about 0.1 mm or more, about 0.3 mm or more, or about 0.5 mm or more. The base hinge may have a thickness of about 10 mm or less, about 2 mm or less, or about 1 mm or less. The base hinge may be any hinge-type suitable to allow for rotational motion between the base and the arms. For example, the base hinge may be a living hinge, known mechanical hinge, or any combination thereof. The base hinge may be a living hinge that can be classified as a flat hinge, a double hinge, a triple hinge, a butterfly hinge, a bi-stable hinge, or any combination thereof. The base hinge may have a resting angle that is measured between the base and the arms, when the device is at rest. The base hinge may have a resting angle that is sufficient to bias the arms outward so that, when the external load is applied, the deformation pattern of the device is pre-biased to rotate outwardly from the axis. The resting angle may be about 90 degrees or more, 95 degrees or more, or about 100 degrees or more. The resting angle may be about 120 degrees or less, about 115 degrees or less, 110 degrees or less, or about 105 degrees or less. When an external force is applied to the device, the base hinge may allow a rotational change between the base and the arms that is measured as the difference between the resting angle, as described herein, and the final angle of the base hinge. The base hinge may have a rotational change that is sufficient to absorb energy when a force is applied to the device. The rotational change may be about 90 degrees or less, about 85 degrees or less, or about 80 degrees or less. The rotational angle change may be about 65 degrees or more, about 70 degrees or more, or about 75 degrees or more. Where the device includes a stop on the arms, the rotational angle change of the base hinge may be different.

The arm hinge functions to allow rotatable or foldable motion between an upper portion of the arm and a lower portion of the arm. The arm hinge may comprise a material which is capable of forming living hinges. The arm hinge may comprise a material which is rigid when no force is applied and which may bend when the expandable bands have fully expanded and a portion of the arms are not parallel to the base. The arm hinge may contact one or more portions of the arm, the retainer, the expandable bands, the connector, or any combination thereof. The arm hinges may be spaced a distance from the base hinge and spaced a distance from the distal end of the arms. The arm hinges may be spaced a first distance from the base hinge and spaced a second distance from the distal ends of the arms, and the first distance may be larger, smaller, or equal to the second distance. The one or more arm hinges may be substantially centered between the base hinge and the ring so that, when an external force pushes the base along the axis, the base hinge, the base, or both and at least two portions of the ring are contactable with each other. The arm hinge may have a thickness that is different than the arms, the base, the base hinge, or any combination thereof. The arm hinge may have any thickness that is sufficient to allow full rotational motion of the base and the arms. The arm hinge may have a thickness that is the same as the base hinge. The arm hinge may have a thickness of about 0.1 mm or more, about 0.3 mm or more, or about 0.5 mm or more. The base hinge may have a thickness of about 10 mm or less, about 2 mm or less, or about 1 mm or less. The arm hinge may be any hinge-type suitable to allow for rotational motion between the upper portion and the lower portion of the arms. For example, the arm hinge may be a living hinge, a known mechanical hinge, or any combination thereof. The arm hinge may be a living hinge that is classifiable as a flat hinge, a double hinge, a triple hinge, a butterfly hinge, a bi-stable hinge, or any combination thereof. The arm hinge may have a resting angle that is measured between an upper portion and a lower portion of the arms, when the device is at rest. The arm hinge may have a resting angle which is sufficient to establish a predisposition to an outward rotational pattern when the external load is applied. The resting angle may be about 120 degrees or more, 130 degrees or more, or about 140 degrees or more. The resting angle may be about 180 degrees or less, about 160 degrees or less, or about 150 degrees or less. When an external force is applied to the device, the arm hinge may allow a rotational change between the upper portion and the lower portion the arms that is measured as the difference between the resting angle, as described herein, and the final angle of the arm hinge. The arm hinge may have a rotational change that is sufficient to absorb energy when a force is applied to the device. The rotational change may be about 180 degrees or less, about 170 degrees or less, or about 160 degrees or less. The rotational angle change may be about 130 degrees or more, about 140 degrees or more, or about 150 degrees or more. Where the device includes a stop on the upper portion or lower portion of the arms, the rotational angle change of the arm hinge may be different.

The one or more arm hinges, the base hinge, or both may comprise a material which is rotatable, bendable, or both during at least one high impact event. The one or more arm hinges, the base hinge, or any combination thereof comprise one or more of a polyolefin, a modified polyolefin, a polycarbonate/acrylonitrile butadiene styrene, an acrylonitrile based styrene based material, a polyamide, a polypropylene, polyethylene, polyester elastomer thermoplastic, thermoplastic polyolefin, co-polyester, thermoplastic polyurethane, polyester, or any combination thereof. The arm hinges, the base hinge, or both may be thinned or cut to allow the base and the arms to bend or rotate at the arm hinges, the base hinge, or both at a rotational angle. The rotational angle may be similar to the rotational change described herein in relation to the base hinge, the arm hinge, or both. In some examples, the arm hinge and the base hinge are composed of one or more of the same materials. In other examples, the arm hinge and the base hinge are made of different materials.

The components of the device including the base, the arms, the base hinge, the arm hinge, the ring, the expandable band, or any combination thereof may comprise a composition with one or more addition additives that improve the efficiency of the device to absorb energy from external force application. Each component may include one or more of these additives or no additives. The additives may improve or alter stiffness, elasticity, rigidity, brittleness, temperature tolerance, aesthetics, colors, impact stability, or any combination thereof. The additives may include fillers, fibers, particles, pigments, impact modifiers, flame retardants, anti-static agents, heat stabilizers, internal lubricants, light stabilizers, plasticizers, hollow spheres, or any combination thereof. The fillers may comprise any fillers that when dispersed in a final composition provide improved coefficient of linear thermal expansion, modulus, impact, heat resistance, failure strain, yield stress and the like. Exemplary fiber types include polymeric fibers, carbon fibers, glass fibers and the like. The one of more additives may be present in an amount of about 1 to about 50 percent by weight based on the weight of the composition.

The arms may include one or more retainers. The one or more retainers function to secure the expandable bands to the device. The one or more retainers may be positioned on the arms, the arm hinge, the connector, or any combination thereof. The one or more retainers may interface with the one or more expandable bands so that the expandable bands are expandable without disconnecting from one or more of the arms. The retainer may be any shape that is sufficient to secure or hold the expandable bands against the arm, and the retainer may be any shape that keeps the expandable bands in a location or position for maximum energy attenuation. The one or more retainers may be a square, round, rectangular, triangular, oblong, elliptical, or any shape sufficient to secure the expandable bands. The one or more retainers may include connection features that assist with holding or securing the expandable band with the arm or arm hinge. The connection features of the one or more retainers may include one or more of a hook, clasp, adhesive, detent, snap-fit, welding, or a combination thereof.

The arms may include one or more connectors. The one or more connectors function to provide a rotatable connection between the distal end of arms and the expandable bands or the ring. The one or more connectors may contact the expandable bands, the ring, the arms, or any combination thereof. The one or more connectors may interface with the distal end of one or more of the arms. The one or more connectors may be integrally molded with one or more of the arms. The one or more connectors may be integrally molded with each arm of the device. The one or more connectors may connect with the distal end of the arm at a living hinge that is similar to the base hinge, the arm hinge or both. The one or more connectors may be configured as a snap feature, a hook feature, a wrap feature, strap feature, or any feature disconnect-able and rotatable about the ring. The connector may be composed of one or more materials that are sufficient to provide a rotatable and/or releasable connection between the one or more connectors and the ring, the expandable bands, or both. The one or more connectors may be similar to the base, the arms, the base hinge, the arm hinge, or any combination thereof.

The arm or device may further include a stop that is positioned on an inside surface of the arm, relative to the device, and proximate to the arm hinge. In other words, the stop is positioned on the inside of the arm so that the stop is contactable with the arm when the arm is folded or rotated. The stop may be positioned on or near the arm hinge so that the upper portion, lower portion, or both are bendable or deformable when the arm folds or rotates. The stop functions to bend a portion of the arm when the upper portion and the lower portion of the arms rotate relative to each other. The stop may bend any portion of the arm including either the upper portion or the lower portion of the arm. The bending of the arm by the stop increases the amount of energy absorbed by the device by allowing, but resisting, bending of a portion of the arm by being a literal obstruction for the arm. Each arm of the device may include a stop. The device may include stops on some or all of the arms. The stop may be a cylindrical, tubular, rectangular, square, triangle, or any shape that is capable preventing further rotational motion of at least one portion of an arm. The stop may contact an interior portion of the arm hinge so that, when the arms rotate, the stop prevents rotating at a stop angle at the arm hinge. The stop may prevent rotating at any stop angle sufficient to obstruct the arm from rotating or folding. The stop angle may be about 120 degrees or less, about 110 degrees or less, or about 100 degrees or less. The stop angle may be about 70 degrees or more, about 80 degrees or more, or about 90 degrees or more. A portion of an arm may be configured to bend over the stop by remaining fixed at the arm hinge so that the portion of the arms acts as a cantilever and absorbs energy from the external force applied to the base as the portion of the arm bends over the stop. The arms may bend over the stop like a cantilever at any angle sufficient to absorb energy from the bending of the arms. When an upper portion of the arm bends over the stop like a cantilever, the angle between the base and the upper portion may be about 30 degrees or more, about 40 degrees or more, or about 50 degrees or more. The angle between the base and the upper portion may be about 90 degrees or less, about 70 degrees or less, or about 60 degrees or less. The stop may have any height sufficient to contact the upper or lower portion and cause the upper and/or lower portion to bend at the upper and/or lower portions rotate or pivot relative to each other. For example, the height may be about 2 millimeters or more, about 4 millimeters or more, or about 6 millimeters or more. The height may be about 20 millimeters or less, about 15 millimeters or less or less, or about 10 millimeters or less. The stop may have any thickness sufficient to absorb energy by bending or by bending the upper and/or lower portions of the arms when the upper and/or lower arms rotate relative to each other. For example, the thickness may be about 0.1 millimeters or more, about 0.5 millimeters or more, or about 1.0 millimeters or more. The thickness may be about 3.0 millimeters or less, about 2.0 millimeters or less, or about 1.5 millimeters or less. The stop may have a thickness that tapers from the top to the bottom so that the bending angles can be tuned for optimal energy absorption.

The ring functions to hold the distal end of the arms in a fixed position and allow the arms to rotate about the ring. The ring may be referred to as first or second support. The ring may be releasably connectable, rotatably connectable, or both with the connector, the arms, or both. Relative to the base, the ring may be positioned so that the base and the ring are substantially parallel. In some examples, the ring may have the same or a similar diameter. In some examples, the ring and the base may be aligned vertically. The arms may be releasably connectable with the ring so that the arms are rotatable about the ring and disconnect-able from the ring. The ring may be fused with one of the arms, and the ring may be releasably connectable with another arm so that the base, the arms, and the ring are a single contiguously molded part. Where the ring is fused with at least one arm, the connection between the ring and the at least one arm may be a hinge similar to the base hinge, the arm hinge, or both. The ring may comprise a material which is capable of holding the distal ends of the arms in a fixed position when force is applied to the device and arms rotate relative to the base, the ring, the expandable bands, or any combination thereof. The ring may comprise one or more of a metal, polycarbonate, polyacetal, polyacrylic, polyphenol, polyimide, glass epoxy, polystyrene, glass reinforced thermoset polyester, polyolefin, a modified polyolefin, a polycarbonate/acrylonitrile butadiene styrene, an acrylonitrile-based styrene based material, a polyamide, a polypropylene, polyethylene, polyester elastomer thermoplastic, thermoplastic polyolefin, copolyester, thermoplastic polyurethane, or any combination thereof. The ring may be composed of one or more of the same or different materials than the arms, the base, the arm hinge, the base hinge, the one or more connectors, or any combination thereof. The ring may have a diameter that is measured as a straight line that extends from side to side through the center of the ring. The ring may have any diameter sufficient to allow the arms rotate or fold on the ring and may contain features to limit the motion of the arms along the length of the ring. The diameter of the ring may be about 5 mm or more, about 20 mm or more, or about 40 mm or more. The diameter of the ring may be about 150 mm or less, about 100 mm or less, or about 50 mm or less. The ring may have a diameter that is the same or equal to the diameter of the base, the expandable bands (at rest), or both.

The support functions to assist with the device standing upright relative to or adhering to an external environment. The support may be attached to the ring. For example, the support may be attached to the ring by an adhesive, fasteners, or both. The support may be integrated with the ring. For example, the ring and the support may be a part of the same mold. The support may have any height sufficient to raise the device above the ground and allow uninterrupted rotation or pivoting of the connector. For example, the support may have a height of about 1 mm, about 20 mm, or about 40 mm. The height may be about 150 mm or less, about 100 mm or less, or about 50 mm or less. The support may have any diameter sufficient to assist the device with standing upright when on an external surface. For example, the support may have a diameter of about 5 mm or more, about 20 mm or more, or about 40 mm or more. The diameter may be about 150 mm or less, about 100 mm or less, or about 50 mm or less.

The expandable band functions to absorb energy when a force is applied to the device by expanding as the arms fold or rotate. The expandable bands may function to absorb energy when the arms bend, rotate, or both. The expandable bands may also function to provide tension on the external surface of the device. The expandable bands may contact the arm hinges, the connector, the arms, the one or more retainers, or any combination thereof. The device may include any number of bands required to control the absorption of energy from an external force. The device may include the one or more expandable bands, two or more expandable bands, three or more expandable bands, four or more expandable bands or a plurality of expandable bands. The expandable band may have any structure necessary to control the folding or rotating of the arms, the absorption of energy from an external force applied on the device and may have features used to maintain desired placement of the bands of the arms. The expandable bands may have a structure that is a braided elastic, woven elastic, knitted elastic, rubber band, or any combination thereof. The expandable bands may be made of any material sufficient to control the absorption of energy from an external force being applied on the device. The expandable bands may comprise one or more of ethylene propylene diene monomer rubber, silicone rubber, polychloroprene rubber, natural rubbers, synthetic rubber, nitrile rubber, acrylonitrile butadiene rubber, polytetrafluoroethylene, fluoropolymer elastomer, thermoplastic elastomer, polybutadiene rubber, butyl rubber, volcanized rubbers, or any combination thereof. The expandable bands may have a diameter that is measured at rest as a straight line passing from side to side through the center of the expandable band. At rest, the expandable bands may have a diameter that is sufficient to remain in contact with the arms, the arm hinge, the one or more connectors, or any combination thereof and may provide tension to keep the component to any desired pre-loaded configuration. The diameter of the expandable bands may be about 5 mm or more, about 20 mm or more, or about 40 mm or more. The diameter of the expandable bands may be about 150 mm or less, about 100 mm or less, or about 50 mm or less. The expandable band's capability of absorbing energy may be tuned using materials described herein so the degree of elasticity is controlled. For example, the expandable bands may be tuned to control the amount of energy controlled when an external force is applied to the device by choosing a material that is more or less elastic. In other examples, the expandable bands may be tuned to control the expansion factor of when an external force is applied to the device. The expansion factor can be represented by a ratio between an expansion length of the expandable bands and the diameter of the expandable bands at rest. For example, the ratio may be about 3:2 or more, about 2:1 or more, or about 5:2 or more. The ratio may be about 3:1 or less, about 7:2 or less, or about 4:1 or less.

The cylinder functions to absorb energy from a compression force applied to the base after or while the arms rotate, pivot, and/or bend when the cylinder contacts an external surface proximate to the connector and/or rings. For example, the external surface may be considered a portion of a vehicle, a helmet, a barrier, or any other structure that the cylinder is contacting and/or adhered to. The cylinder may be a single use energy absorption technique that when the cylinder contacts the external surface the cylinder deforms and absorbs additional energy as the cylinder deforms and the upper and/or lower portions of the arms bend, rotate, and/or pivot. In some examples, the cylinder may have a shape of a circle, square, triangle, rectangle, pentagon, hexagon, heptagon, octagon, or any other shape sufficient to absorb energy when the cylinder contacts the external surface. The cylinder may be positioned at a location of the base and extend towards the distal ends of the arms and/or the ring. The cylinder may extend away from the base at a perpendicular angle (i.e., 90 degrees). The cylinder may extend away from the base at a tapered angle. For example, the tapered angle may be perpendicular on a surface of the inside of the cylinder and tapered at the surface facing the arms. The tapered angle may be about 120 degrees or more, about 110 degrees or more, or about 100 degrees or more. The tapered angle may be about 150 degree or less, about 140 degrees or less, or about 130 degrees or less. The cylinder may have a structure that has a shape that is substantially cone shaped and have an angle of the cone that tilts inward or outward at angle. For example, the angle may be about 150 degrees or less, about 130 degrees or less, or about 110 degrees or less. The angle may be about 50 degrees or more, about 70 degrees or more or about 95 degrees or more. The cylinder may have any thickness sufficient to absorb energy as the cylinder contacts the external surface and/or when the arms are rotating, bending, or pivoting. For example, the cylinder may have a thickness of about 0.5 millimeters or more, about 1.0 millimeters or more, or about 1.5 millimeters or more. The cylinder may have a thickness of about 3.0 millimeters or less, about 2.5 millimeters or less, or about 2.0 millimeters or less. The cylinder may have any height sufficient to allow the cylinder to deform before the base hinge contacts the ring and/or the connector and absorb energy from a compression force applied to the base and/or any other portion of the device. For example, the cylinder may have a height of about 5 millimeters or more, about 7 millimeters or more, or about 9 millimeters or more. The height may be about 15 millimeters or less, about 12 millimeters or less, or about 10 millimeters or less.

The axis functions to provide a reference point of from where each arm rotates away from the base. The axis may extend through the center of the base, the aperture, the expandable bands, the ring, or any combination thereof. When a force is applied along the axis of the base, each of the arms may rotate uniformly and at a substantially similar angle change rate. When a force is applied on the base and is off centered relative to the axis, at least one of the arms may rotate at a different angle change rate relative to another of the arms. In other words, when the force is applied on the base and is off centered relative to the axis, at least one of the arms may bend at an accelerated rate when compared to the other arms.

The device may include three (3) distinct phases that each absorb energy until the device is completely deformed. In phase one (1), a compression force may have a compression force applied to the base, which causes the arms to rotate relative to the base and away from the axis. The energy absorbed in phase one (1) may be from the expansion and/or stretching of the expandable band as the arms rotate or pivot and push the expandable band away from the axis until a first transition force is achieved. At the beginning of phase one (1), there may be a peak in the energy absorbed, and the device may be tuned to steadily absorb energy along a substantially flat curve until the third transition force, which may be another peak absorption of energy as the cylinder contacts the external surface. The energy absorption may be configured as a first peak absorption followed by a steady absorption of energy followed by a second peak absorption as the cylinder contacts. All three of the transitions forces may be numerically dependent on the material used, height and/or thickness of the individual components of the device, and/or the application of the device (i.e., helmet or vehicular application). The first transition force may be any force or energy sufficient to absorb the compression force applied to the base or any other portion of the device. In phase two (2), the expandable band may reach the first transition force because the stop of the arms moves into contact with an interior surface of the arms and the arms begin to bend over the stop. The arms may bend over the stop until a second transition force is achieved during bending over the stop. The second transition force may be any force or energy sufficient to absorb the compression force applied to the base or any other portion of the device. The first and second transition forces may be equal. The first and second transition forces may be significantly less than the first absorption peak described above. In phase three (3), after a second transition force is achieved, the cylinder may contact the external surface that is adjacent or proximate to the ring and/or the connector until a third transition force is achieved. The third transition force may be any force or energy sufficient to absorb the compression force applied to the base or any other portion of the device. The third transition force may be greater than the first and second transition forces. The third transition force may be substantially equal to the first and/or second absorption peak. After the cylinder contacts the external surface and a third transition force is met, the cylinder may begin to deform, and as the cylinder deforms, the upper and lower portions of the arms may continue to bend on the stops so that both the deformation of the cylinder and the bending of the upper and lower portions absorb energy. Once the arms bend and the cylinder deforms sufficiently so that the base hinge contacts the ring and/or connector, the device has fully deformed.

The devices may be arranged as a plurality of devices so that one or more devices function together and collectively absorb energy from an external force. The plurality of devices may be arranged on, in, or around an apparatus. The apparatus herein may also be described as an assembly. The apparatus may include at least a substrate with a plurality of devices arranged on the apparatus. The apparatus may include any number of devices sufficient to control the energy absorption from an external force that is being applied to the devices, the apparatus, or both. A plurality of devices may be about 2 or more devices, about 5 or more devices, or about 10 or more devices. A plurality of devices may be about 15 or less devices, about 25 or less devices, or about 50 or less devices. The apparatus may include a pad as described herein. The apparatus may be in part or wholly an automobile, helmet, shoe, protection barrier, and/or padding assembly. The apparatus may include a plurality of devices arranged on one or more substrates that are configured to protect from external forces by absorbing energy. The plurality of devices may be arranged on the one or more substrates in any way that improves the energy absorption from an external impact. In some configurations, the plurality of devices may be arranged on one or more substrates so that external forces can be absorbed at multiple angles of impact. In some configurations, the plurality of devices may be arranged on the one or more substrates that is a flat surface in a linear pattern so that plurality of devices collectively absorbs an external force and energy is evenly absorbed among the plurality of devices. In an apparatus, some or all of the plurality of devices may be reusable after an external force is applied on the apparatus. In this way, the apparatus, the plurality of devices, or both provide a technique for high impact absorption that mitigates the user's cost to replacing parts after a single use. In some examples, some or all of the plurality of devices is intended to absorb the external force applied on the apparatus, and subsequently, a user may have to replace one or more of the plurality of devices before another external force is applied to the apparatus.

Where the apparatus is a helmet or used with a helmet, the apparatus functions to protect a user's head, provide better air venting, or both. Because each of the devices have a hollow internal structure, when utilized in a helmet, the plurality of devices can be arranged so that a user is protected from external forces contacting the generally impermeable substrate, and the devices can be arranged so that there can be additional air flow or venting under the impermeable substrate of the helmet. This technique provides the user better compensation methods in hot climates. In one example, the one or more substrates may be an exterior layer of a helmet having an internal surface and an external surface that is configured to protect a user from an external force applied on the external surface, and the plurality of devices may be arranged on the helmet at the internal surface and are configured to contact a user's head. In some configurations, the substrate may be a helmet that includes an interior layer having a user surface and a contact surface and configured to contact a user's head at the user surface and an exterior layer having an internal surface and an external surface and configured to contact an external force at the external surface. In some examples, the plurality of devices may be arranged between the contact surface and the internal surface and configured to absorb energy from an external force applied at the external surface.

Where the apparatus is a portion of an automobile or vehicle, the apparatus functions to protect a user from any impact to the car by absorbing energy of an external impact before the energy contacts the user. Alternatively, or in combination, the apparatus functions to absorb energy from an external impact so that contact of internal parts to the user is mitigated, and thus, the user is better protected from injury. In some examples, the substrate of the apparatus may be an automotive layer that is positioned on the inside of an automotive body that is configured to absorb an impact from an external force, and the plurality of devices are arranged between the substrate and the automotive body. In other examples, the substrate is a protective automotive body including an internal layer having a user surface that is proximate to a user and a contact surface that is in contact with the plurality of devices, and an exterior layer having an exterior surface proximate to the automotive body and an interior surface contacting the plurality of devices. The internal layer, the exterior layer, and the plurality of devices may be configured to absorb an impact from an external force applied at the automotive body.

Where the apparatus is a barrier, the apparatus functions to protect a person from high-speed impacts. When the apparatus is a barrier, the substrate may be one or more of a pad, foam, impermeable plastic, rigid sheet, metal sheet, or any combination thereof. In some examples, the substrate may be an automotive barrier configured to absorb an impact form a high-speed vehicle at the impact side by compressing one or more of the plurality of devices. In other examples, the plurality of devices may be arranged on an internal surface of a padding, and an external surface of the padding is intended to receive contact of a high-speed impact so that the plurality of devices can absorb the energy from the high-speed impact in an even fashion.

Figure 2:
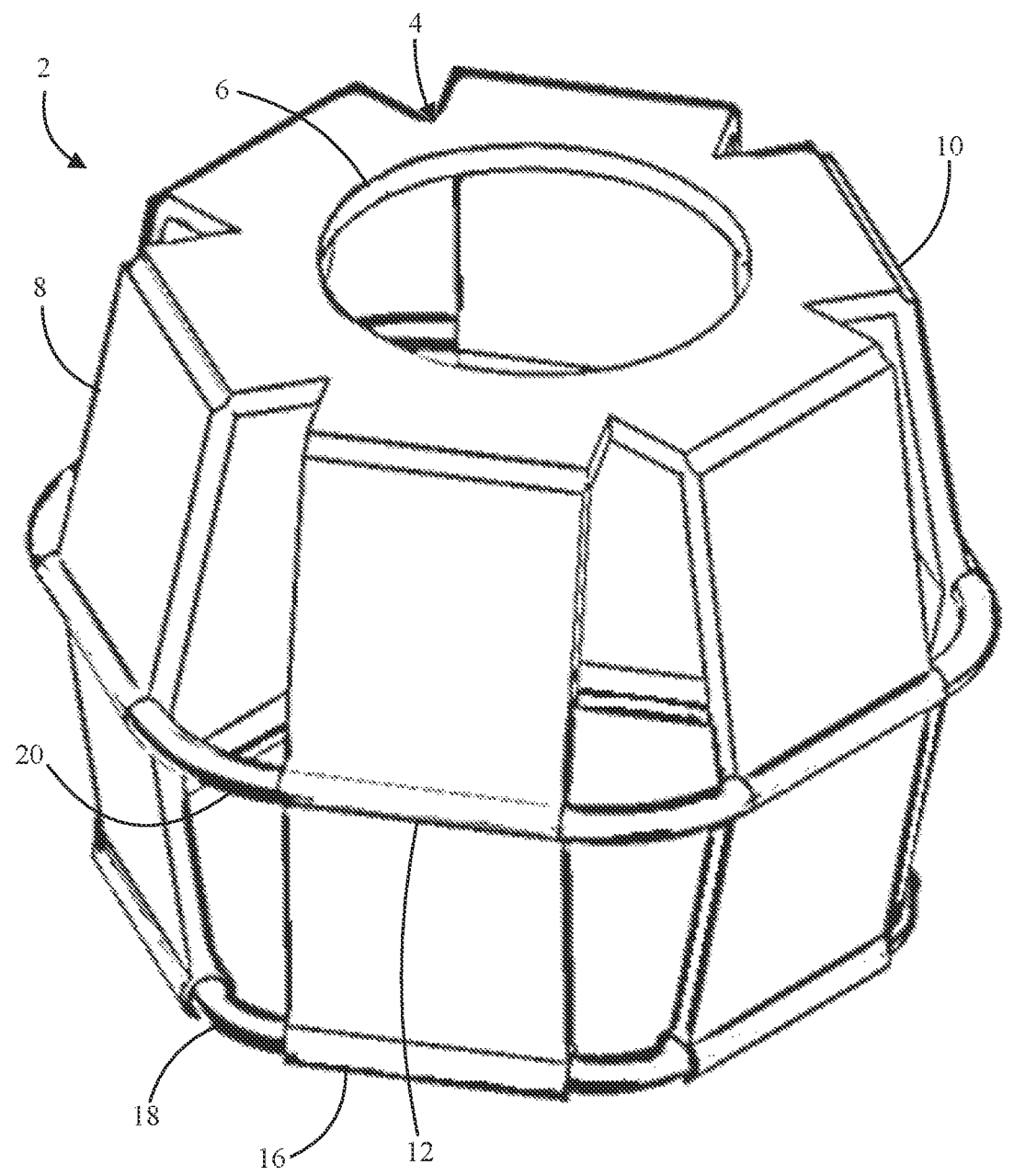
FIG. 2 is a perspective view of a device.

FIG. 1 is a perspective view of a device 2 without one or more expandable bands (FIG. 2) or rings (FIG. 2). The device 2 includes a base 4 with an aperture 6 that is connected to arms 8 at a base hinge 10. An axis X is perpendicular relative to the base 4, and the axis X extends through the center of the base 4. The arms 8 are rotatable about the base hinge 10, and the arms 8 are configured to rotate towards and away from the axis X. Each arm 8 includes an arm hinge 12 that is configured to allow each arm 8 to fold or rotate. Specifically, each arm 8 has an upper portion and a bottom portion, and the arm hinge 12 is configured to allow the upper portion and the lower portion to rotate relative to each other. Proximate to the arm hinge 12, a retention feature 14 is used to secure the one or more expandable bands (FIG. 2) so that, when the one or more expandable bands (FIG. 2) expand or absorb energy, the one or more expandable bands (FIG. 2) remain within the arm hinge 12. At the distal end of each arm 8, a connector 16 contacts the distal end of the arm 8 and is configured to connect with the ring (FIG. 2).

FIG. 2 is a perspective view of a device 2. The device 2 includes a base 4 with an aperture 6. On the edges of the base 4, each arm 8 connects with the base 4 at a base hinge 10, and the base hinge 10 allows folding or rotating of the arm 8 relative to the base 4 so that, when a force is applied to the device 2, each arm 8 is configured to fold or rotate and at least partially absorb energy. At about a lengthwise middle of each arm 8, an arm hinge 12 allows folding or rotating of an upper portion and a lower portion of each arm 8 relative to each upper portion and lower portion. At the arm hinge 12, an expandable band 20 contacts each arm 8 and is configured to absorb energy when the arm 8 folds or rotates at the base hinge 10, the arm hinge 12, or both. Each arm 8 includes a connector 16 that secures a ring 18 to the device 2. The connector 16 on each arm 8 are rotatable about the ring 18. The ring 18 is fixed and lacks substantial flexibility. When one or more of the arms 8 fold or rotate and the expandable band 20 absorbs energy by expanding as the one or more arms 8 fold or rotate, the ring 18 remains fixed below the base 4 and holds the distal ends of each arm 8 in a fixed position.

Figure 3:
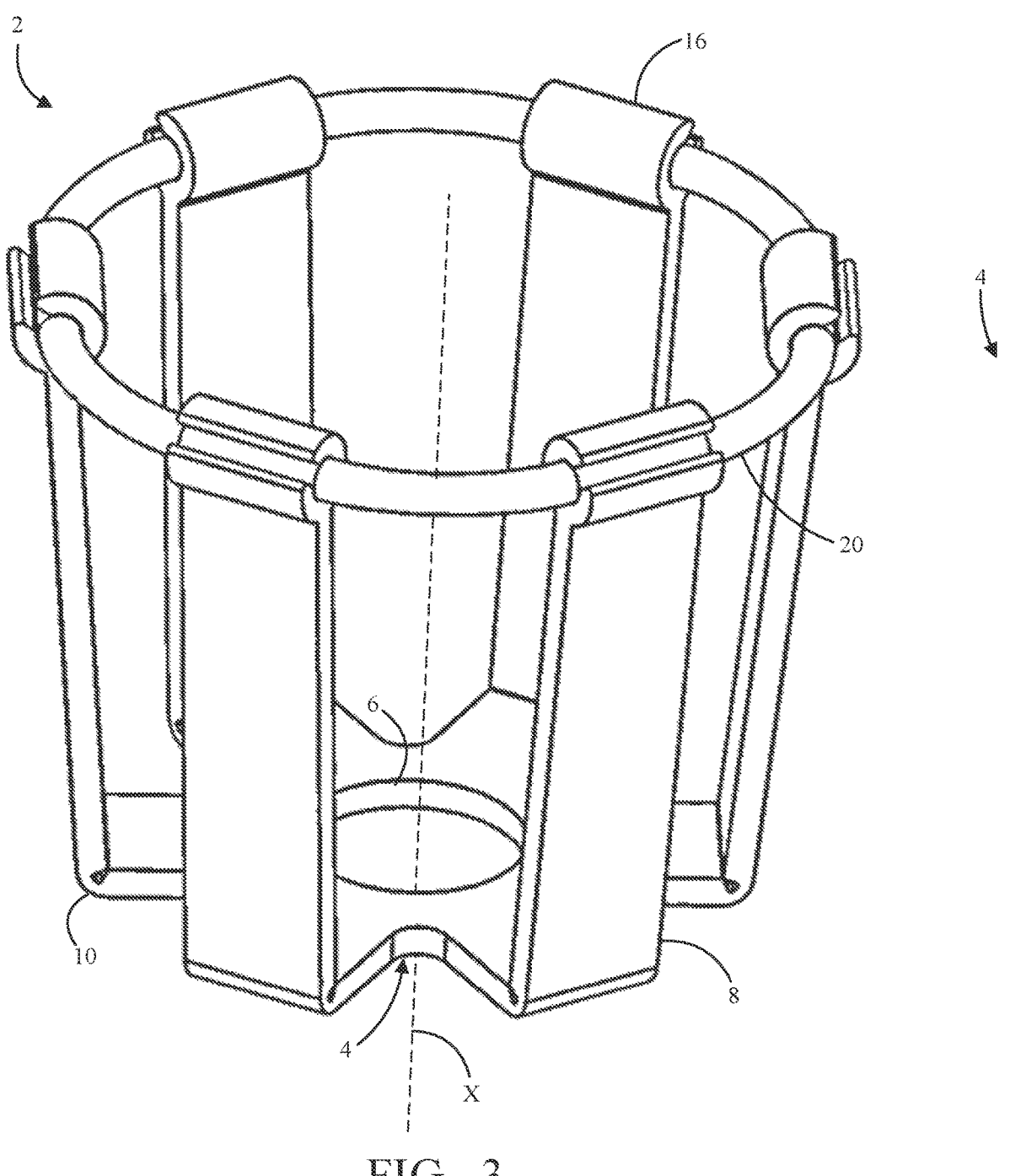
FIG. 3 is a perspective view of a device.

FIG. 3 is a perspective view of a device 2. The device 2 includes an aperture 6 and arms 8, and the arms 8 connect with the base 4 at base hinges 10 that allow the base 4 and the arms 8 to fold or rotate relative to each other. An axis X extends through the center of the aperture 6 and is perpendicular relative to the base 4. When each of the arms 8 fold or rotate, the arms 8 fold or rotate away from the axis X. At a distal end of each arm 8, a connector 16 secures an expandable band 20, and the connector 16 is rotatable about the expandable band 20. The expandable band 20 is configured to absorb energy by expanding when one or more of the arms 8 fold or rotate about the base 4.

Figure 4:
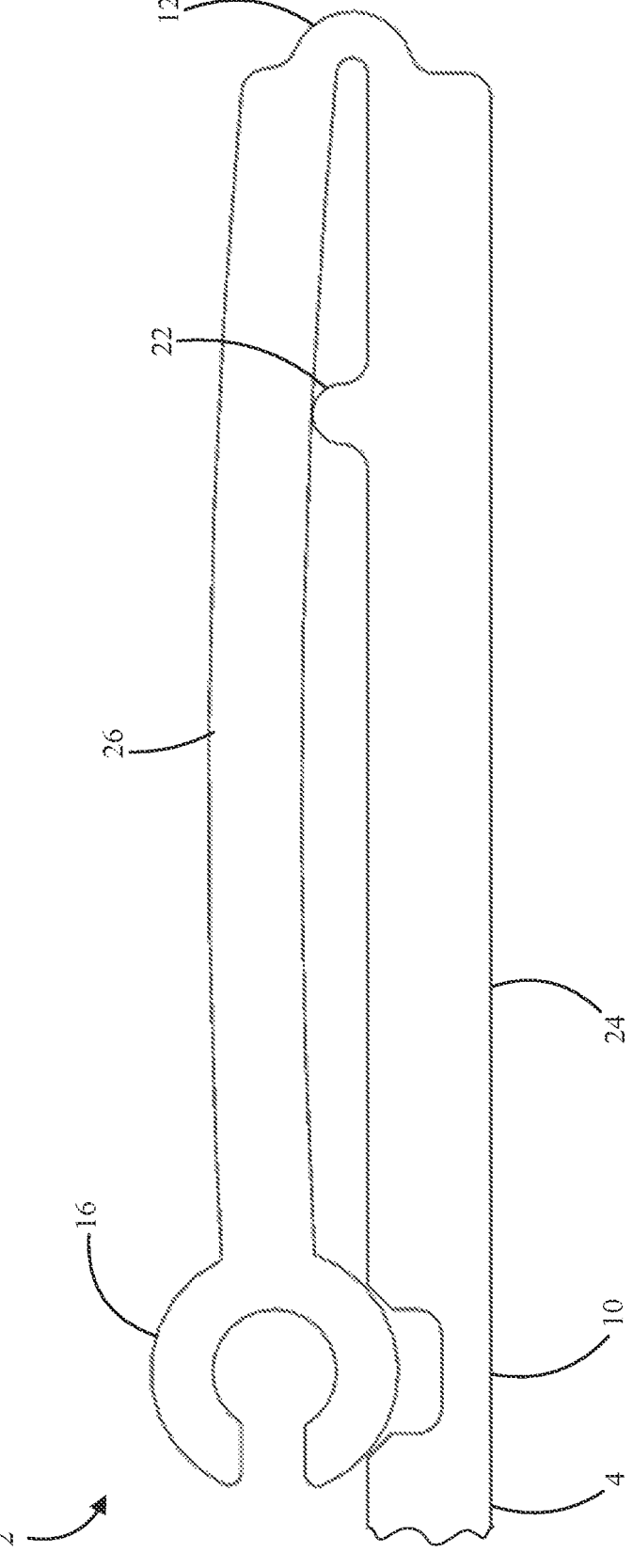
FIG. 4 is a side view of an arm that is rotated over a stop.

FIG. 4 is a side view of an arm 8 that is rotated over a stop 22. An upper portion 24 of the arm 8 is rotatably connected with the base 4 at the base hinge 10, and the upper portion 24 is rotatably connected with a lower portion 26 of the arm 8 at the arm hinge 12. The base 4 and the upper portion 24 are substantially flat or parallel, and the base 4 and the upper portion 24 have rotatable motion relative to each other. The lower portion 26 of the arm 8 is in rotatable connection with a connector 16. When the arm 8 rotates about the arm hinge 12, the lower portion 26 of the arm 8 contacts the stop 22, and when the lower portion 26 contacts the stop 22, the lower portion 26 bends or deforms so that the connector 16 moves towards the base hinge 10 and some of the lower portion 26 of the arm 8 that contacts the arm hinge 12 remains in place. In other words, the lower portion 26 remains stationary at the arm hinge 12 and bends or deforms near the point of contact with the stop 22 so that the lower portion 26 bends and allows the connector 16 to move closer to the base hinge 10.

Figure 5:
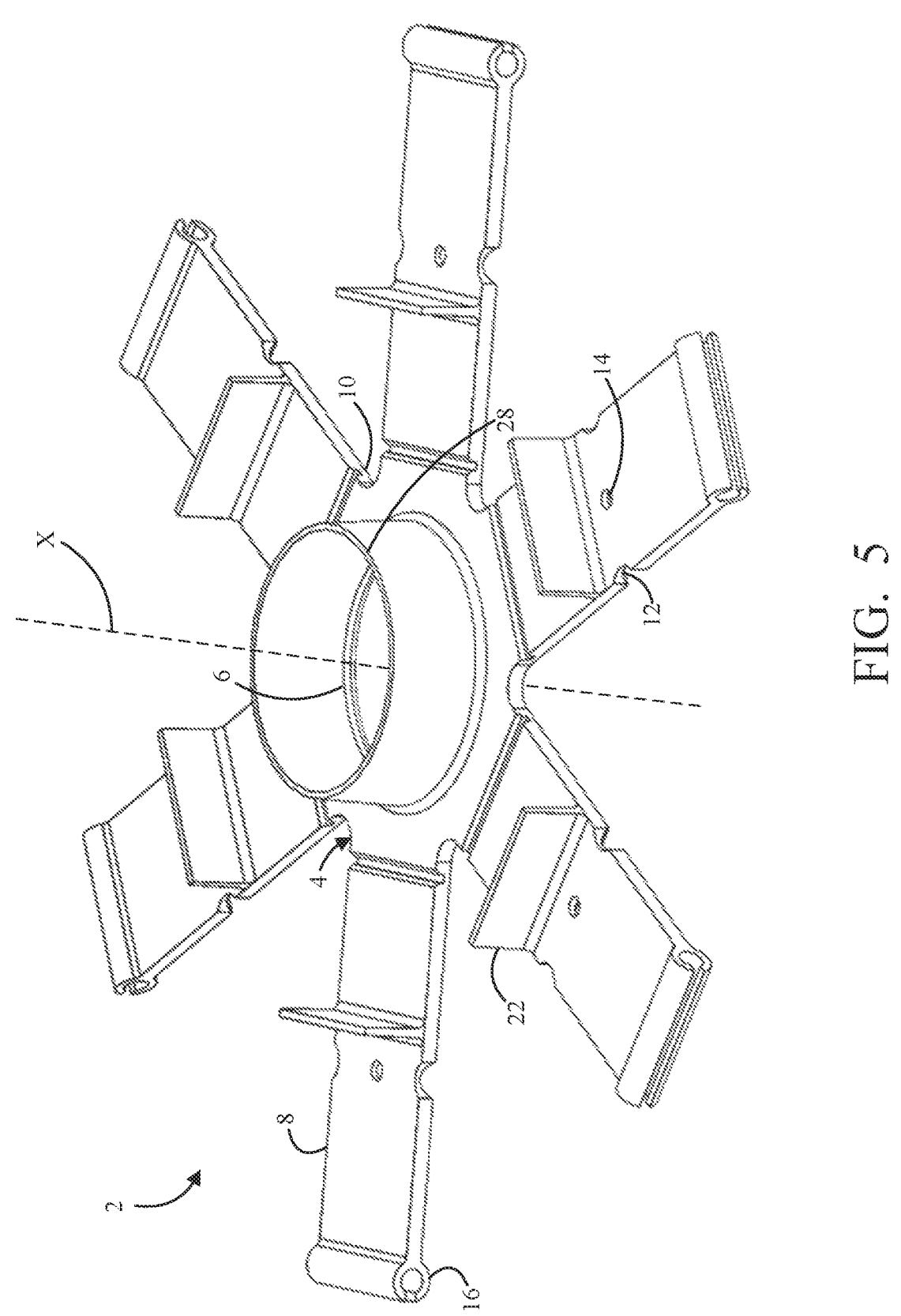
FIG. 5 is a perspective view of a device.

FIG. 5 is a perspective view of a device 2. The device 2 includes a base 4 defining an aperture 6 at a location of axis X. Arms 8 attach to the base 4 at base hinges 10 that are configured to rotate or pivot the arms 8 about the base 4 towards and away from the axis X. A arm hinge 12 is positioned at about a middle of each of the arms 8 so that the arms 8 can rotate or pivot about themselves. At the arm hinge 12, a retention feature 14 is position that in combination are configured to retain an expandable band (see e.g., expandable band 20, FIG. 6) so that resistance is applied to the arms 8 at the arm hinges 12. A connector 16 is positioned at a distal end of the arm 8 so that the arm 8 is connectable with a ring (see e.g., ring 18, FIG. 6). A stop 22 is positioned at a location of each of the arms 8 between the arm hinge 12 and the base hinge 10 and is configured to prevent contact of two portions of the arm 8 by deforming and absorbing energy as the arm 8 rotates about the arm hinge 12. A cylinder 28 is attached or integrated with the base 4 at a location of the aperture 6 and is configured to absorb energy by deforming once the cylinder 28 comes into contact with another surface that is opposite relative to the base 4.

Figure 6:
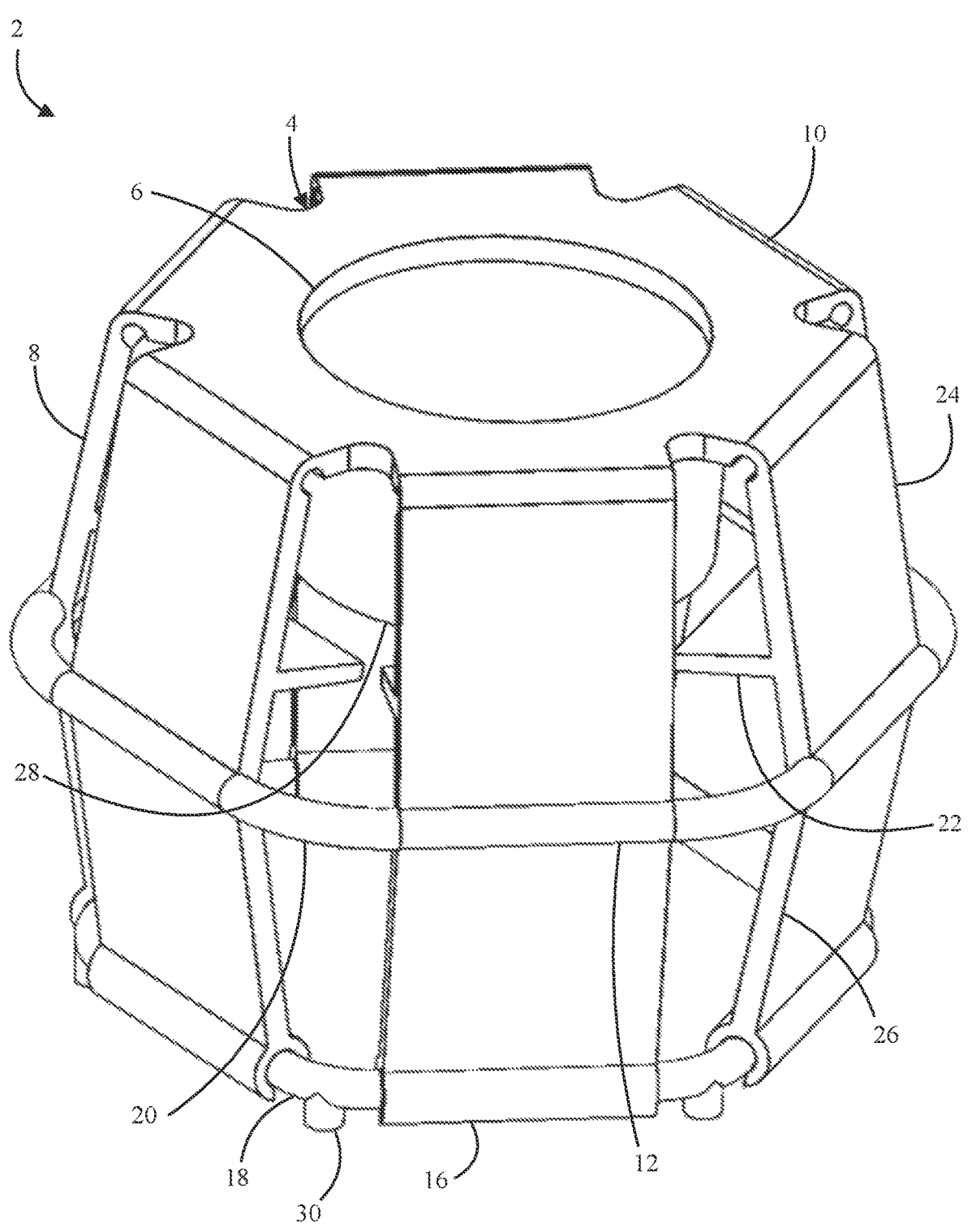
FIG. 6 is a perspective view of a device.

FIG. 6 is a perspective view of a device 2. The device includes a base 4 defining an aperture 6, and the base 4 is in pivotable and/or rotatable connection with the arms 8 at base hinges 10. At the base 4, a cylinder 28 extends perpendicularly from the base 4 and towards a location of the ring 18. The ring 18 includes supports 30 that assist the device 2 with staying upright during use of the device 2. Connectors 16 rotatably and/or pivotably connect the ring 18 and the arms 8 so that the arms 8 can rotate or pivot at both the base hinges 10 and the connectors 16. At an upper portion 24, a stop 22 is included that is configured to contact the lower portion 26 so that additional energy is absorbed from deforming the stop 22 and bending the upper and lower portions 24, 26. At the arm hinges 12, the expandable band 20 is positioned around the device 2 at each of the arm hinges 12.

Figure 7:
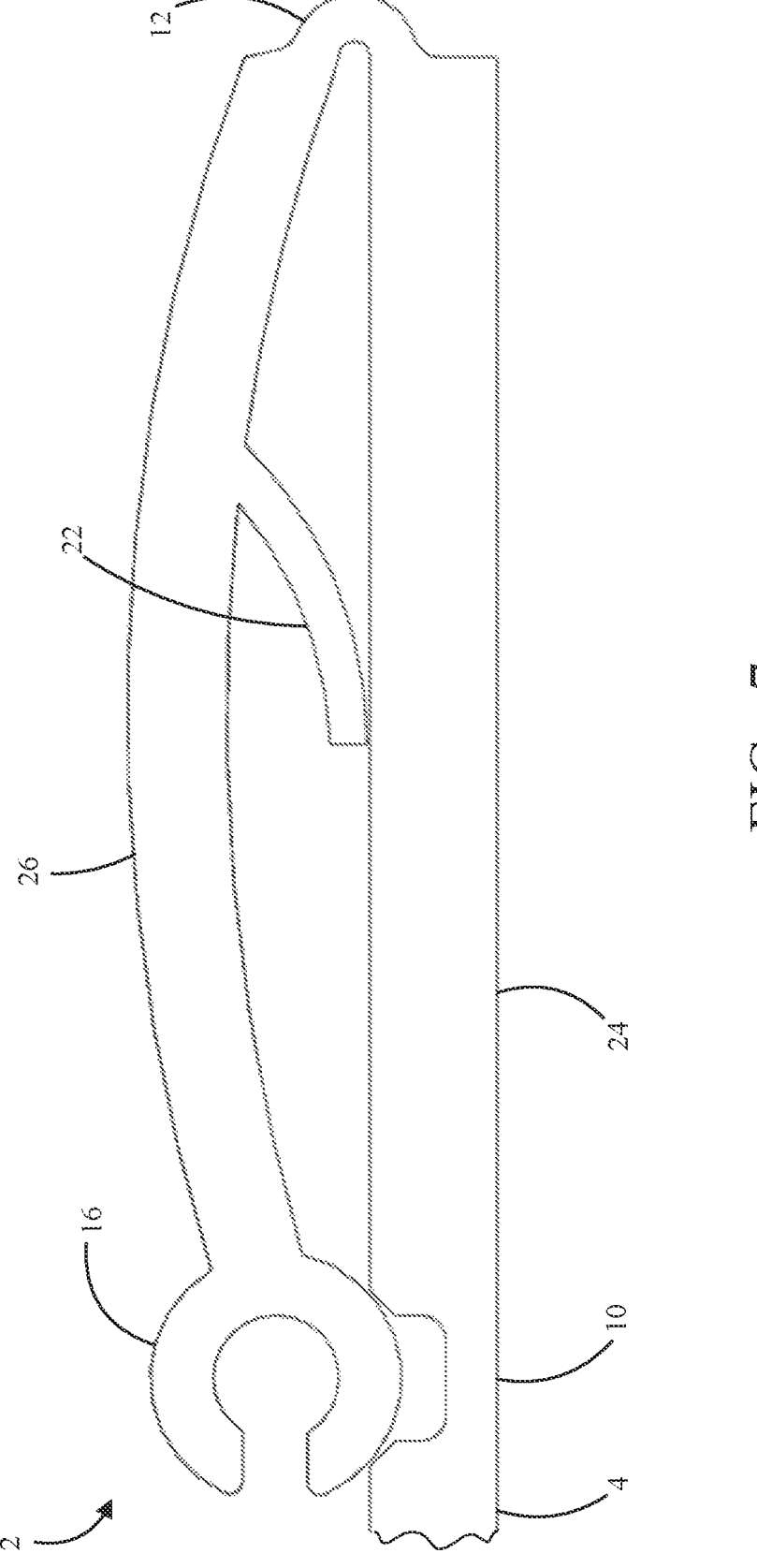
FIG. 7 is a side view of an arm that is rotated over a stop.

FIG. 7 is a side view of an arm 8 that is rotated over a stop 22. An upper portion 24 of the arm 8 is rotatably connected with the base 4 at the base hinge 10, and the upper portion 24 is rotatably connected with a lower portion 26 of the arm 8 at the arm hinge 12. The base 4 and the upper portion 24 are substantially flat or parallel, and the base 4 and the upper portion 24 have rotatable motion relative to each other. The lower portion 26 of the arm 8 is in rotatable connection with a connector 16. When the arm 8 rotates about the arm hinge 12, the lower portion 26 of the arm 8 contacts the stop 22, and when the lower portion 26 contacts the stop 22, the lower portion 26 bends or deforms so that the connector 16 moves towards the base hinge 10 and some of the lower portion 26 of the arm 8 that contacts the arm hinge 12 remains in place. In other words, the lower portion 26 remains stationary at the arm hinge 12 and bends or deforms near the point of contact with the stop 22 so that the lower portion 26 bends and allows the connector 16 to move closer to the base hinge 10. Once the stop 22 comes into contact with the upper portion 24, the stop 22 absorbs energy from the arm 8 that are rotating by deforming as the lower portion 26 and the upper portion 24 rotate closer together. As the stop 22 deforms, the stop 22 deforms so that a distal end of the stop 22 bends towards the base 4, and the stop 22 is configured to prevent contact between the upper and lower portions 24, 26.

Any numerical values recited include all values from the lower value to the upper value in increments of one unit provided that there is a separation of at least 2 units between any lower value and any higher value. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

ENUMERATED EMBODIMENTS

1. A device, comprising: a. a base having an axis that is centered and perpendicular relative to the base; b. two or more arms each connected to the base at a base hinge, wherein the base hinge is configured to rotate the two or more arms away from the axis; and c. one or more expandable bands connected with distal ends of the two or more arms and configured to absorb energy from rotating of the two or more arms, wherein the device is configured to absorb energy when an external force is applied along the axis of the base.

2. A device, comprising: a. a base having an axis that is centered and perpendicular relative to the base; b. two or more arms each connected to the base at a base hinge; c. one or more arm hinges embedded in each of the two or more arms; and configured to allow the two or more arms to rotate in an outward direction relative to the axis; d. a ring having a position that is parallel and fixed relative to the base and the axis, wherein the ring is connected with distal ends of the two or more arms and configured to allow rotational motion of the two or more arms without moving the position of the ring; and e. one or more expandable bands connected with the one or more arm hinges and configured to absorb energy from folding of the two or more arms, wherein the device is configured to absorb energy when the base and the ring are pushed together along the axis by an external force.

3. The device according to any one of the preceding embodiments, wherein the base and the distal portion of the two or more arms are spaced by a compression length that extends along the axis, and wherein when force is applied to the base, the compression length is reduced by a percentage length of about 70 percent or more.

4. The device according to embodiment 2 or 3, wherein the one or more arm hinges are spaced a distance from the base hinge and spaced a distance from the distal end of the two or more arms.

5. The device according to any one of embodiment 2 to 4, wherein the one or more arm hinges are spaced a first distance from the base hinge and spaced a second distance from the distal ends of the two or more arms, and wherein the first distance is larger than the second distance.

6. The device according to embodiments 2 to 4, wherein the one or more arm hinges are spaced a first distance from the base hinge and spaced a second distance from the distal ends of the two or more arms, and wherein the first distance is smaller than the second distance.

7. The device according to any one of embodiment 2 to 6, further comprising a stop contacting an interior portion of the arm hinge so that, when the two or more arms rotate, the stop prevents rotating at an angle of 90° or less at the arm hinge.

8. The device according to any one of embodiments 2 to 7, wherein a portion of the two or more arms is configured to bend over the stop by remaining fixed at the arm hinge so that the portion of the two or more arms acts as a cantilever and absorbs energy from the external force applied to the base.

9. The device according to any one of embodiments 2 to 8, wherein the stop extends perpendicularly from the interior portion of the arm so that, when the two or more arms rotate, the stop absorbs energy by bending as the stop contacts another interior portion of the arm.

10. The device according to any one of embodiment 2 to 9, wherein the one or more arm hinges are substantially centered between the base hinge and the ring so that, when an external force pushes the base along the axis, the base hinge, the base, or both and at least two portions of the ring are contactable with each other.

11. The device of according to according to any one of embodiments 2 to 10, wherein the two or more arms are releasably connectable with the ring so that the two or more arms are rotatable about the ring and disconnect-able from the ring.

12. The device according to any one of embodiments 2 to 11, wherein the two or more arms are releasably connectable from the ring by a connector.

13. The device according to embodiment 1 or 3, wherein the two or more arms are releasably connectable from the expandable bands by a connector.

14. The device according to anyone of the preceding embodiments, wherein further comprising a connector interfaced with the distal end of the two or more arms, wherein the connector is configured to be a snap feature, a hook feature, a wrap feature, or any feature disconnect-able and rotatable about the ring.

15. The device according to anyone of the preceding embodiments, wherein the two or more arms and a connector are integrally molded together.

16. The device according to any one of the preceding embodiments, wherein the one or more expandable bands includes two or more expandable bands, three or more expandable bands, four or more expandable bands or a plurality of expandable bands.

17. The device according to any one of embodiments 2 to 12 or 13 to 16, wherein the ring is fused with one arm of the two or more arms, and wherein the ring is releasably connectable with another arm of the two or more arms so that the base, the two or more arms, and the ring are a single contiguously molded part.

18. The device according to any one of the preceding embodiments, wherein the two or more arms each include one or more retainers that interface with the one or more expandable bands so that the one or more expandable bands are expandable without disconnecting with the two or more arms.

19. The device according to any one of the preceding embodiments, wherein the base includes an aperture that is centered on the base and is configured to connect with a pad that is compressible through the aperture.

20. The device according to any one of the preceding embodiments, further comprising: a. a pad connected with the base, the distal portion of the two or more arms, or the ring and configured to contact a user or a substrate.

21. The device according to any one of the preceding embodiments, further comprising: a. a pad connected with the base, the distal portion of the two or more arms, or the ring and configured to contact a substrate at one or more of adhesive, two-sided tape, hook and loop fasteners, or any combination thereof.

22. The device according to any one of the preceding embodiments, wherein a pad is connected with the base, the distal portion of the two or more arms, or the ring, and wherein the pad comprises a material which is configured to absorb at least some of the energy when an external force is applied to the base.

23. The device according to any one of the preceding embodiments, wherein the pad comprises one or more of an expanded polystyrene, expanded polypropylene, ethylene-vinyl acetate, polyurethane foam, polychloroprene rubber, expanded polylactic acid, closed cell comfort foam, open cell comfort foam, memory foam, air bladder, fluid filled bladders, gel filled bladders, or any combination thereof.

24. The device according to any one of the preceding embodiments, wherein the base, the two or more arms, or both comprise a material which is rigid and capable of forming a living hinge.

25. The device according to any one of the preceding embodiments, wherein the one or more arm hinges, the base hinge, or both comprise a material which is rotatable, bendable, or both during at least one high impact event.

26. The device according to any one of the preceding embodiments, wherein the base, the two or more arms, or both comprise one or more first materials which are capable of forming a living hinge, and wherein the base, the two or more arms, or both is coupled with one or more second materials capable of bending when stress is applied and firmly holding shape when resting.

27. The device according to any one of the preceding embodiments, wherein the base, the two or more arms, the one or more arm hinges, the base hinge, or any combination thereof comprise one or more of a polyolefin, a modified polyolefin, a polycarbonate/acrylonitrile butadiene styrene, an acrylonitrile based styrene based material, a polyamide, a polypropylene, polyethylene, polyester elastomer thermoplastic, thermoplastic polyolefin, co-polyester, thermoplastic polyurethane, or any combination thereof.

28. The device according to any one of the preceding embodiments, wherein the ring comprises a material which is capable of holding the distal ends of the two or more arms in a fixed position, when force is applied to the device and the two or more arms rotate relative to the base, the ring, or both.

29. The device according to any one of the preceding embodiments, wherein the ring comprises one or more of a metal, polycarbonate, polyacetal, polyacrylic, polyphenol, polyimide, glass epoxy, polystyrene, glass reinforced thermoset polyester, polyolefin, a modified polyolefin, a polycarbonate/acrylonitrile butadiene styrene, an acrylonitrile based styrene based material, a polyamide, a polypropylene, polyethylene, polyester elastomer thermoplastic, thermoplastic polyolefin, co-polyester, thermoplastic polyurethane, or any combination thereof.

30. The device according to any one of the preceding embodiments, wherein the one or more expandable bands absorbs energy when the two or more arms bend, rotate, or both.

31. The device according to any one of the preceding embodiments, wherein the one or more expandable bands comprise one or more of ethylene propylene diene monomer rubber, silicone rubber, polychloroprene rubber, natural rubbers, synthetic rubber, nitrile rubber, acrylonitrile butadiene rubber, polytetrafluoroethylene, fluoropolymer elastomer, thermoplastic elastomer, polybutadiene rubber, butyl rubber, volcanized rubbers, or any combination thereof.

32. The device according to any one of the preceding embodiments, wherein the one or more arm hinges, the base hinge, or both has a thickness, and the base, the two or more arms, or both has a thickness, and wherein the thickness of the one or more arm hinges, the base hinge, or both is less than the thickness of the base, the two or more arms, or both.

33. The device according to any one of the preceding embodiments, wherein the one or more arm hinges, the base hinge, or both is thinned or cut to allow the base and the two or more arms to bend or rotate at the one or more arm hinges, the base hinge, or both at an angle of about 180 degrees or less.

34. The device according to any one of the preceding embodiments, wherein, when a force is applied along the axis of the base, each of the two or more arms rotate uniformly and at a substantially similar angle change rate.

35. The device according to any one of the preceding embodiments, wherein, when a force is applied on the base and is off centered relative to the axis, at least one of the two or more arms rotate at a different angle change rate relative to another of the two or more arms.

36. The device according to any one of the preceding embodiments, wherein the one or more expandable bands, the one or more arm hinges, the base hinge, or any combination thereof provides tension on an external surface of the device so that energy is absorbed on the external surface of the device.

37. The device according to any one of the preceding embodiments, further comprising: a cylinder positioned at a location of the base, the cylinder extending perpendicularly towards the ring.

38. A apparatus, comprising a plurality of devices according to embodiments 1-35, wherein the plurality of devices are connected to a substrate, and wherein the plurality of the devices are arranged on the substrate so that the plurality of devices are capable of absorbing energy when an external force is applied on the substrate.

39. The apparatus according to embodiment 38, further comprising a pad connected with an exterior surface of the base and configured to contact a user.

40. The apparatus according to embodiment 38 or 39, wherein the base includes an aperture that is centered on the base and is configured to connect with a pad that is compressible through the aperture.

41. The apparatus according to any one of embodiments 38 to 40, further comprising: a. a pad connected with the base, the distal portion of the two or more arms, or the ring and configured to contact a user or a substrate.

42. The apparatus according to any one of embodiments 38 to 41, further comprising: a. a pad connected with the base, the distal portion of the two or more arms, or the ring and configured to contact a substrate at one or more of adhesive, two-sided tape, hook and loop fasteners, or any combination thereof.

43. The apparatus according to any one of embodiments 38 to 42, wherein the substrate is an exterior layer of a helmet having an internal surface and an external surface and is configured to protect a user from an external force applied on the external surface, and wherein the plurality of devices are arranged on the helmet at the internal surface and are configured to contact a user's head.

44. The apparatus according to any one of embodiments 38 to 43, wherein the substrate is a helmet, comprising: a. an interior layer having a user surface and a contact surface and configured to contact a user's head at the user surface; and b. an exterior layer having an internal surface and an external surface and configured to contact an external force at the external surface, wherein the plurality of devices are arranged between the contact surface and the internal surface and configured to absorb energy from an external force applied at the external surface.

45. The apparatus according to any one of embodiments 38 to 44, wherein the substrate is an automotive layer that is positioned on the inside of an automotive body and is configured to absorb an impact from an external force, and wherein the plurality of substrates are arranged between the substrate and the automotive body.

46. The apparatus according to any one of embodiments 38 to 45, wherein the substrate is a protective automotive body, comprising: a. an automotive body; b. an internal layer having a user surface that is proximate to a user and a contact surface that is in contact with the plurality of devices; and c. an exterior layer having an exterior surface proximate to the automotive body and an interior surface contacting the plurality of devices, wherein the internal layer, the exterior layer, and the plurality of devices are configured to absorb an impact from an external force applied at the automotive body.

47. The apparatus according to any one of embodiments 38 to 46, wherein the substrate is an automotive barrier configured to absorb an impact form a high-speed vehicle at the impact side by compressing one or more of the plurality of devices.

48. The apparatus according to any one of embodiments 38 to 47, wherein each of the plurality of devices has compressible length that is measurable from the base to the connection the device and the substrate, and wherein, when a force is applied to the apparatus, at least one of the plurality of devices reduces the compressible length by about 70 percent or more so that energy is absorbed by apparatus.

EXAMPLES

The following examples are provided to illustrate the disclosure but are not intended to limit the scope thereof.

Figures 8A, 8B, 8C:
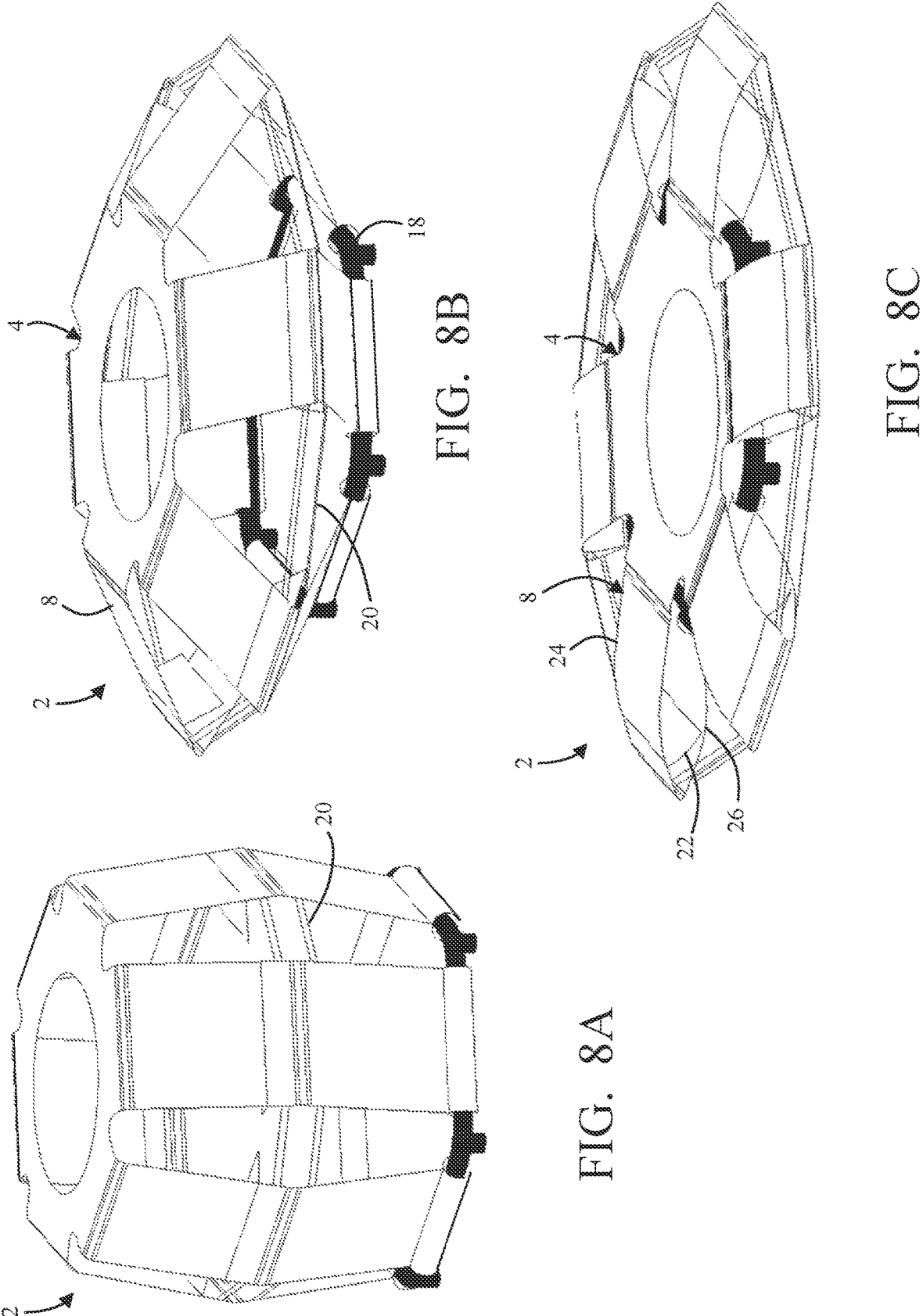
FIG. 8A is a model of a device at rest.
FIG. 8B is a model of the device of FIG. 8A with the expandable band being stretched.
FIG. 8C is a model of the device of FIG. 8A-8B with arms being bent over stops.

FIG. 8A is a model of a device 2 at rest. At rest, no force is being applied to any portion of the device 2, except any forces applied by the expandable band 20 that is in compressive contact around an outer surface of the device 2.

FIG. 8B is a model of the device of FIG. 8A with the expandable band 20 being stretched. As compression forces are applied to the device at or proximate to the base 4, the arms 8 rotate or pivot relative to the base 4 and the ring 18, and the expandable band 20 absorbs energy by stretching or expanding as the arms 8 rotate and extend away from the base 4 and the ring 18. The energy absorbed by the expandable band 20 is achieved depending on the cross-sectional area of the expandable band 20 increasing and/or by the tensile module of the expandable band 20 increasing. In other words, the cross-sectional area (i.e., diameter) of the expandable band 20 affects total absorbable force by the expandable band 20.

FIG. 8C is a model of the device of FIG. 8A-8B with arms 8 being bent over stops 22. As the expandable bands 20 absorb energy, the stops 22, which are attached or integrated with the upper portions 24, move closer into contact with lower portions 26 of the arm 8. As the stops 22 come into contact with the lower portion 26, the stops 22 bend inward towards the base 4, and when the stops 22 bend to a certain threshold, the upper and lower portions 24, 26 bend to absorb additional energy. At this stage of compression forces being applied on the base 4, the expandable band 20 absorbs a small portion of the energy because the expandable band 20 is near full expansion or stretch, and the arms 8 and stops 22 absorb the majority of the energy by bending when in the stop 22 contacts the lower portion 26. To increase the energy absorbed by from the compression forces, the arms 8 can be made thicker and/or wider and/or the elastic modulus of the arms can be increased.

Figures 9A, 9B:
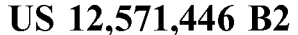
FIG. 9A is a model of a device at rest.
FIG. 9B is a model of the device of FIG. 9A with expandable band being stretched.

FIG. 9A is a model of a device at rest. At rest, no force is being applied to any portion of the device 2, except any forces applied by the expandable band 20 that is in compressive contact around an outer surface of the device 2.

FIG. 9B is a model of the device 2 of FIG. 9A with expandable band being stretched. As compression forces are applied to the device at or proximate to the base 4, the arms 8 rotate or pivot relative to the base 4, and the expandable band 20 absorbs energy by stretching or expanding as the arms 8 rotate and extend away from the base 4. The energy absorbed by the expandable band 20 is achieved by the cross-sectional area of the expandable band 20 increasing and/or by the tensile module of the expandable band 20 increasing. In other words, the cross-sectional area (i.e., diameter) of the expandable band 20 affects total absorbable force by the expandable band 20.

Figures 9C, 9D:
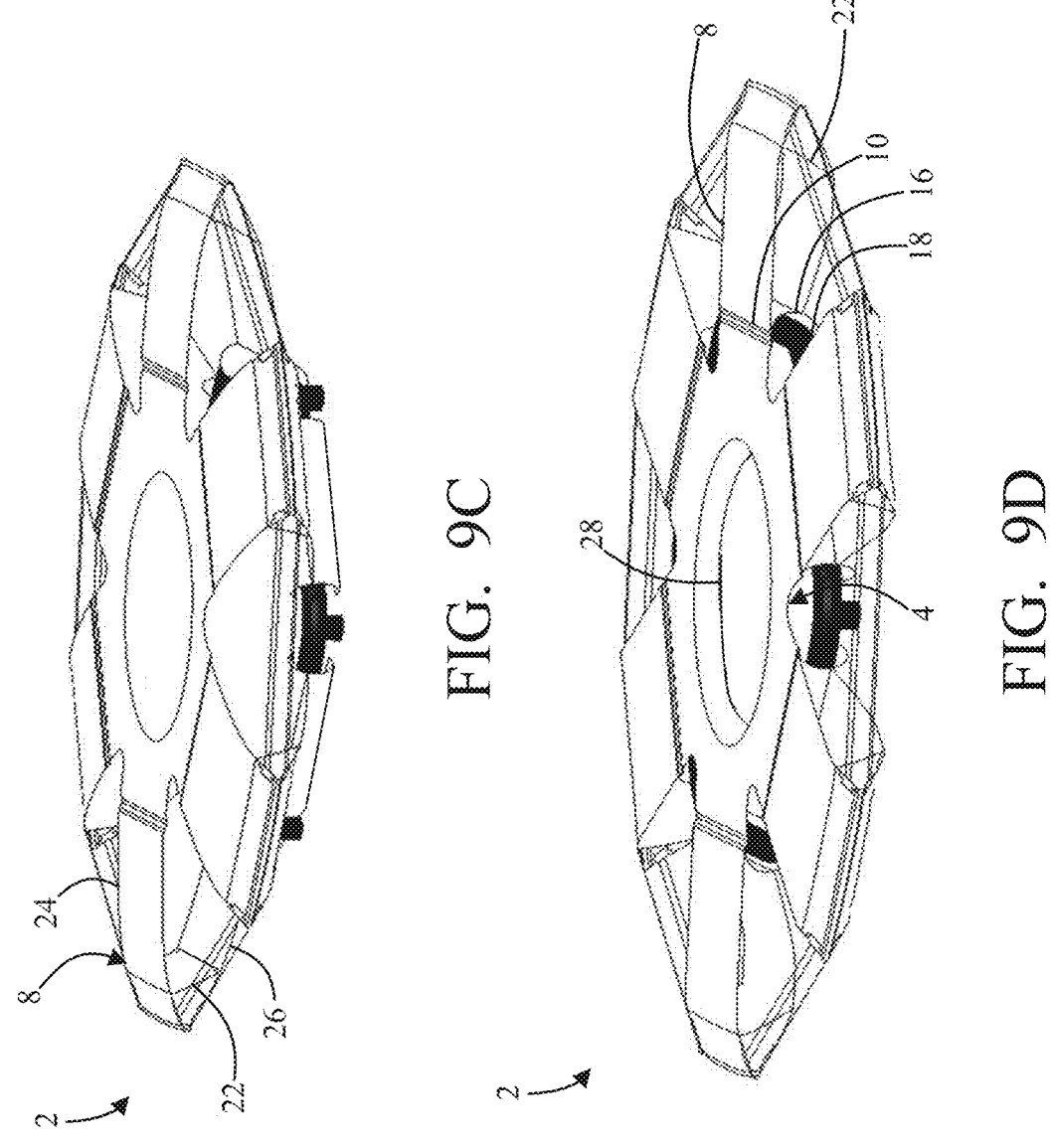
FIG. 9C is a model of the device of FIGS. 9A-9B with arms being bent over stops.
FIG. 9D is a model of the device of FIGS. 9A-9C with a cylinder being crushed.

FIG. 9C is a model of the device 2 of FIGS. 9A-9B with arms 8 being bent over stops 22. As the expandable bands 20 absorb energy, the stops 22, which are attached or integrated with the upper portions 24, move closer into contact with lower portions 26 of the arm 8. As the stops 22 come into contact with the lower portion 26, the stops 22 bend inward towards the base 4, and when the stops 22 bend to a certain threshold, the upper and lower portions 24, 26 bend to absorb additional energy. At this stage of compression forces being applied on the base 4, the expandable band 20 absorbs a small portion of the energy because the expandable band 20 is near full expansion or stretch, and the arms 8 and stops 22 absorb the majority of the energy by bending when in the stop 22 contacts the lower portion 26. To increase the energy absorbed by from the compression forces, the arms 8 can be made thicker and/or wider and/or the elastic modulus of the arms can be increased.

FIG. 9D is a model of the device 2 of FIGS. 9A-9C with a cylinder 28 being crushed. After the arms 8 and stops 22 bend or deform (i.e., FIG. 9C), the arms 8 continue to bend until the cylinder 28 contacts another surface, such as an external surface that the device 2 is contacted with. The cylinder 28 absorbs additional energy from the compression forces being applied on the base 4 by deforming to a point where the base hinge 10 contacts the connector 16 and/or the ring 18. Additional energy is absorbed as the cylinder 28 deforms by continual bending of the arms 8. To increase the amount of energy absorbed by the cylinder 28 while deforming, the thickness and/or the height of the cylinder 28 may be enlarged so that the capacity to absorb energy is increased and the point where the cylinder 28 begins to deform relative to the rotation of the arms 8 is earlier (i.e., because the height is larger).

Figure 10:
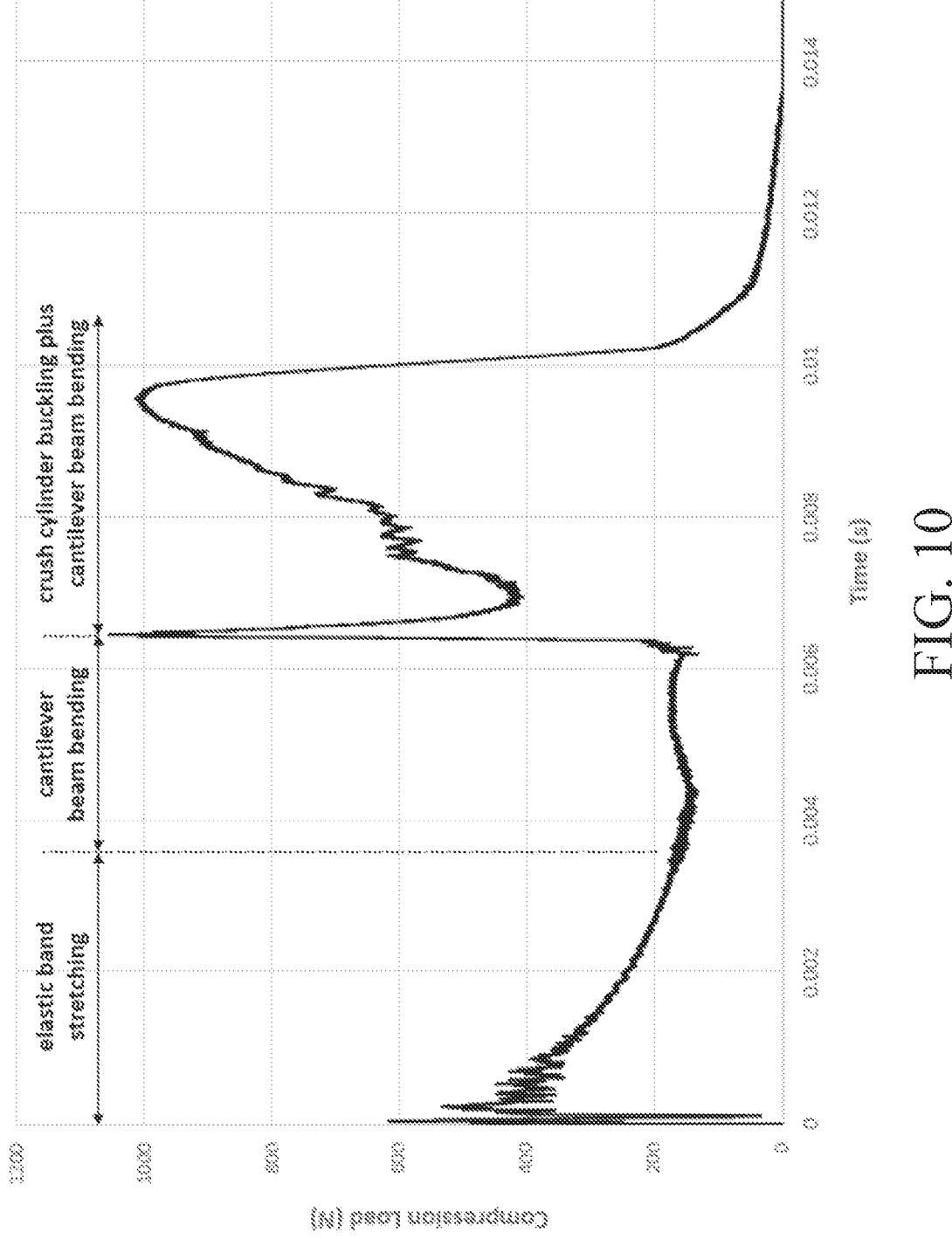
FIG. 10 is a graph showing the compression load on the device modeled in FIGS. 9A-9D.

FIG. 10 is a graph showing the compression load on the device 2 modeled in FIGS. 9A-9D. Compression load (Newtons) is plotted against the time of compression (seconds). Initially, the expandable band 20 (e.g., FIGS. 8B and 9B) absorbs a large portion of energy as the external force contacts the device 2. This may be described as the first absorption peak. Then, the arms 8 rotate or pivot relative to the base 4 and the ring 18 and the expandable band absorbs energy. This may be described as the first transition force. After the stops 22 come into contact with lower portions 26 of the arms 8, the arms 8 and/or stops 22 begin to bend and absorb additional energy (FIGS. 8C and 9C). This may be described as the second transition force. Finally, the cylinder 28 contacts another surface (e.g., a surface that the ring 18 is contacting) and a large portion of energy is absorbed by the cylinder 28. This may be described as the third transition force or the second absorption peak. After contact of the cylinder 28 and the external surface, the cylinder 28 begins to deform to absorb additional energy and the arms 8 and/or stops continue to bend simultaneously as the cylinder 28 deforms. The cylinder 28, arms 8, and/or stops 22 continue to absorb energy until the base hinges 10 contact the connectors 16 and/or ring 18, upon which the device 2 has absorbed the maximum absorbable energy (FIG. 9D) and has completely deformed. The transitional forces, absorption peaks, and maximum absorbable energy can be affected by the thickness and height of the arms 8, stops 22, and/or cylinder 28; the width of the stops 22 and/or arms 8; and/or the cross-section of the expandable band 20 and can be tuned to a particular application, such as a helmet or vehicular purpose.

The invention claimed is:

1. A device, comprising:
   a. a first support and a second support that are separated from each other and along an axis that intersects the first support and the second support;
   b. a cylinder connected with the first support or the second support and configured as a single use energy absorbing element and absorb energy when a force is applied to the device; and
   c. two or more arms connected with and outwardly rotatable at the first support and the second support so that as the two or more arms rotate and the first support and the second support move into contact with each other along the axis and crush the cylinder.

2. The device of claim 1, wherein the cylinder comprises a wall that extend substantially perpendicular relative to the first support and/or the second support.

3. The device of claim 2, wherein the wall of the cylinder define an aperture.

4. The device of claim 1, wherein the two or more arms each comprise one or more hinges configured to facilitate bending of the two or more arms as the two or more arms rotate at the first support and the second support.

5. The device of claim 4, further comprising:
   a. one or more expandable bands connected with an exterior surface of the two or more arms and configured to absorb energy as the two or more arms bend.

6. The device of claim 4, wherein the two or more arms each further comprise:
   a. a first portion connected with the one or more hinges and the first support; and b. a second portion connected with the one or more hinges and the second support, wherein the first portion and the second portion of each of the two or more arms are configured to fold onto each other as the two or more arms bend.

7. The device of claim 6, wherein the cylinder has a height that is a same or less than a height of the first portion or the second portion.

8. A device, comprising:

a. a first support comprising a cylinder that is configured to inwardly depress towards the first support when a force is applied;

b. a second support spaced a distance from the first support along an axis centered relative to and intersected with the first support and the second support; and c. two or more arms each connected with and outwardly rotatable and foldable relative to the first support and the second support so that the cylinder depresses as the first support and the second support move into contact with each other, wherein the cylinder is configured to move into contact with the second support or an external environment adjacent to the second support when the force is applied to rotate and fold the two or more arms outwardly and depress the cylinder.

9. The device of claim 8, wherein one of the first support or the second support is configured to connect with an apparatus at an external surface of the first support or the second support that does not include the cylinder.

10. The device of claim 9, further comprising:

a. one or more expandable bands connected with an exterior surface of and not an internal surface of each of the two or more arms and configured to absorb energy as the first support and the second support move into contact with each other and/or the cylinder along the axis.

11. The device of claim 8, wherein the cylinder comprises a wall that defines an aperture.

12. The device of claim 11, wherein the two or more arms each comprise:

a. a first end connected to the first support;

b. a second end connected to the second support; and c. one or more hinges that connect the first end and the second end, wherein the first end and the second end of each of the two or more arms is configured to rotate outward and fold onto each other as a force is applied to the first support and/or the second support.

13. The device of claim 8, wherein a first portion of each of the two or more arms comprise a stop configured to bend a second portion of each of the two or more arms as the two or more arms fold into each other.

14. The device of claim 13, wherein the first portion and the second portion of each of the two or more arms are configured to fold into each other at the stop before, after, or during contact with the cylinder.

15. The device of claim 8, wherein the first support is a base comprising an aperture at a location of the cylinder, and wherein the second support is a ring.

16. A device, comprising:

a. a base;

b. a ring aligned with the base along an axis;

c. two or more arms that connect the base and the ring and are configured to outwardly rotate relative to the base and the ring and bend as the base and the ring move into contact with each other along the axis; and d. one or more expandable bands connected with one or more exterior surfaces and not an interior surface of the two or more arms and configured to absorb energy by expanding outward and increasing in diameter during rotation and bending of the two or more arms at a foldable portion.

17. The device of claim 16, wherein the foldable portion comprises one or more hinges configured to allow the two or more arms to fold onto each other.

18. The device of claim 16, wherein each of the two or more arms comprises a stop configured to facilitate bending each of the two or more arms.

19. The device of claim 18, wherein the base is configured to connect with an apparatus at an external surface of the base.

20. The device of claim 19, wherein the base further comprises a cylinder positioned on the base and configured to depress as the ring and/or two or more arms move into contact with the cylinder.

\* \* \* \* \*